US012625041B2

(12) United States Patent
Liu et al.

(10) Patent No.: US 12,625,041 B2
(45) Date of Patent: May 12, 2026

(54) AUTOMATED SAMPLE PREPARATION FOR SPENT MEDIA ANALYSIS

(71) Applicant: IDEX Health & Science LLC, Rohnert Park, CA (US)

(72) Inventors: Quan Liu, Petaluma, CA (US); John Barnacle, Petaluma, CA (US); Eric Beemer, Anacortes, WA (US)

(73) Assignee: IDEX Health & Science LLC, Rohnert Park, CA (US)

( * ) Notice: Subject to any disclaimer, the term of this patent is extended or adjusted under 35 U.S.C. 154(b) by 706 days.

(21) Appl. No.: 18/082,177

(22) Filed: Dec. 15, 2022

(65) Prior Publication Data

US 2023/0184642 A1 Jun. 15, 2023

Related U.S. Application Data

(60) Provisional application No. 63/339,678, filed on May 9, 2022, provisional application No. 63/336,024, filed on Apr. 28, 2022, provisional application No. 63/289,878, filed on Dec. 15, 2021.

(51) Int. Cl.
*G01N 1/38* (2006.01)
*G01N 35/10* (2006.01)

(52) U.S. Cl.
CPC .......... *G01N 1/38* (2013.01); *G01N 35/1097* (2013.01); *G01N 2001/383* (2013.01)

(58) Field of Classification Search
CPC ................. G01N 1/38; G01N 35/1097; G01N 2001/383; G01N 1/4077; G01N 35/00; G01N 15/01; G01N 2001/4088; C12M 47/02; C12M 47/04; C12M 47/00
See application file for complete search history.

(56) References Cited

U.S. PATENT DOCUMENTS

| | | | |
|---|---|---|---|
| 4,036,063 | A | 7/1977 | Roof et al. |
| 4,839,292 | A | 6/1989 | Cremonese et al. |
| 6,258,154 | B1 | 7/2001 | Berndt et al. |
| 7,520,988 | B2 | 4/2009 | Pahl et al. |
| 9,816,971 | B2 | 11/2017 | Jackson et al. |
| 9,823,225 | B2 | 11/2017 | Cormier et al. |

(Continued)

FOREIGN PATENT DOCUMENTS

| | | |
|---|---|---|
| CN | 107674825 A | 2/2018 |
| EP | 1437597 A1 | 7/2004 |

(Continued)

OTHER PUBLICATIONS

"Search Report under Section 17 mailed on Jun. 12, 2023", 6 Pages.

(Continued)

*Primary Examiner* — Charles Capozzi
*Assistant Examiner* — Michael Stanley Gzybowski
(74) *Attorney, Agent, or Firm* — Billion & Armitage

(57) ABSTRACT

A method for processing a sample of a cell culture composition includes diluting the sample followed by filtering the diluted sample, wherein the dilution may be at least 10 parts by volume of a diluent to one part sample, and the filter may be a porous membrane with a molecular weight cutoff of less than 20,000 Daltons. The dilution may be carried out at a multiple-port dilution valve having a first condition and a second condition. The sample may be mixed with the diluent at a predetermined dilution ratio when the dilution valve is in the second condition.

13 Claims, 33 Drawing Sheets

(56) References Cited

U.S. PATENT DOCUMENTS

| | | | |
|---|---|---|---|
| 9,833,754 | B2 | 12/2017 | Anderer |
| 10,670,568 | B2 | 6/2020 | Jackson et al. |
| 10,802,001 | B2 | 10/2020 | Burnett et al. |
| 10,953,345 | B2 | 3/2021 | Witt et al. |

FOREIGN PATENT DOCUMENTS

| | | |
|---|---|---|
| EP | 2703808 | 10/2017 |
| WO | 2021252514 A1 | 12/2021 |

OTHER PUBLICATIONS

Steffens, Tim , "Spent Media Analysis—The key to process optimization", https://www.xell.ag/spent-media-analysis-the-key-to-processoptimization/technical-notes/, Jan. 11, 2021.

- - - - - - - No filtration
·················· Injection 1
- - · - - · - - Injection 2
- · - · - · - Injection 3
- - - - - - Injection 4
——— · ——— Injection 5
·-·-·-·-·-· Injection 6
- · ——— · · - Injection 7
- - - - - - - - Injection 8
——— — ——— Injection 9
——————— Injection 10

30% w/V BSA on Hydrosart 10K filter

AUTOMATED SAMPLE PREPARATION FOR SPENT MEDIA ANALYSIS

FIELD OF THE INVENTION

The present invention relates to processing of biological samples generally, and more particularly to an automated system for preparing samples of spent cell culture compositions for analytical analysis.

BACKGROUND OF THE INVENTION

Cell culture is one of the major techniques in the life sciences. The most important and crucial step in cell culture is selecting appropriate growth medium for in vitro cultivation. A growth medium or culture medium is a liquid or gel designed to support the growth of microorganisms, cells, or small plants. Cell culture media generally comprise an appropriate source of energy and compounds which regulate the cell cycle. A typical culture medium is composed of a complement of amino acids, vitamins, inorganic salts, glucose, and serum as a source of growth factors, hormones, and attachment factors. The development of cell culture medium is critical for cell culture.

Spent media analysis is an important tool used to provide crucial information about the amino acids and nutrients that cells use during their growth phase. Spent media analysis also provides details about the metabolites that are produced as a result of cell growth. This is useful to cell line and process development teams, in that it provides data on media composition performance, optimal harvest time and product quality changes that can occur during culture. For example, investigators may be interested in monitoring daily changes in amino acids and metabolites to optimize growth conditions for clones, promote high cell viability, maximize production of titer, ensure high product quality, and reduce or eliminate sequence variant misincorporations. It becomes an important Critical Process Parameter (CPP) that needs to be monitored frequently.

The existing workflow for analyzing spent media includes mainly manual steps that are susceptible to human error. Current spent media sample preparation workflows lack efficiency and reliability. The present invention addresses the need to automate the sample preparation process to improve throughput and to facilitate liquid chromatography/mass spectrometry sample analyzation.

An example of currently existing workflow for sample preparation is illustrated in FIG. 1, and starts with collecting sample from a bioreactor. The sample taken out of the bioreactor normally has solid cells and/or cell debris. The first step of sample preparation is to remove the solid cells and cell debris. The common practice is to use centrifugation to separate solid from liquid in the sample, and thereafter to collect the supernatant from the centrifuge for the next phase.

After the cells/cell debris are removed in the initial centrifugation step, the liquid phase typically still contains large protein molecules. For cell culture/spent media analysis, large protein molecules can pose challenges for liquid chromatography/mass spectrometry analysis. The large protein molecules can become stuck inside the column, reduce column life and increase the back pressure through the column. The protein molecules also compete with ionization, which reduces the effectiveness of the mass spectrometry ionization process. The common practice to remove/reduce large protein molecules from the liquid phase of the sample is through chemical precipitation, followed by centrifugation or filtration. This step is primarily a manual operation, and typically requires that the sample be diluted 2×-5× by adding acetonitrile or methanol.

After the large protein molecules are removed, the sample is diluted to a level that is appropriate for LC/MS analysis. The dilution level for this step could be between 10×-100×. The total dilution level could be up to 200×-300×.

The existing workflow for preparing spent media samples contains mainly manual operations, including multi-dilution processes, loading centrifuges, and removing supernatant out from the mixture. With a large quantity of sample to process, the sample preparation can become a bottleneck. This invention automates the process to shorten the sample preparation time and to bring better results to the final analysis.

SUMMARY OF THE INVENTION

By means of the present invention, sample dilution and optionally filtration may be accomplished with highly controllable automation tools that increases both dilution efficiency and accuracy. The system of the present invention further enables controllability in dilution ratios for mixing multiple samples.

In an embodiment involving a cell culture composition of cells and spent media, a method for processing the composition includes providing a processing apparatus having a dilution module for mixing a sample of the composition with a diluent to form a dilution composition, a filtration module having a filter for filtering the dilution composition into a filtrate and a retentate, and a sample collector for distinguishing a filtrate sample from the filtrate. The dilution module may be operable in at least two conditions, with a first load condition loading the cell culture composition into a sample loading chamber, and a second inject condition combining the cell culture composition from the sample loading chamber with the diluent to form the diluent composition. The processing apparatus preferably defines a first fluidic pathway from the dilution module, through the filtration module, and to the sample collector.

The method for processing the cell culture composition includes motivating the dilution composition through the first fluidic pathway, and operating the sample collector to (i) begin distinguishing the filtrate sample from the filtrate at a first steady state time point when a concentration of the sample in the filtrate at the sample collector has increased to a first steady state concentration, and (ii) subsequent to step (i), cease distinguishing the filtrate sample from the filtrate by no later than a second steady state time point when the concentration of the sample in the filtrate at the sample collector has decreased from the first steady state concentration by a predetermined threshold value.

In some embodiments, the method further includes recording a first switch time point when the dilution module switches from the first condition to the second condition, and recording a second switch time point when the dilution module switches from the second condition to the first condition. A first delay time period may be measured between the first switch time point and the first steady state time point that is subsequent to the first switch time point. A second delay time period may be measured between the first steady state time point and the second steady state time point that is subsequent to the first steady state time point.

The sample collector may be operated to begin distinguishing the filtrate sample from the filtrate upon an expiration of the first delay time period from the first switch point, and to cease distinguishing the filtrate sample from the filtrate no later than the expiration of the second delay period from the first steady state time point.

The sample collector may further be operated to cease distinguishing the filtrate sample from the filtrate upon the expiration of the second delay time period from the first steady state time point.

In some embodiments, the threshold value is 10%.

The sample collector may distinguish the filtrate sample from the filtrate by separating the filtrate sample from the filtrate. The filtrate sample may be motivated to an analysis module for analyzing the filtrate sample. In some embodiments, the analysis module may include a liquid chromatograph, a mass spectrometer, and combinations thereof.

A third delay time period may be measured between the second steady state time point and a third steady state time point subsequent to the second steady state time point when the concentration of sample in the filtrate has decreased to a second steady state concentration.

The dilution module may be operated to mix the sample with the diluent at a mixing ratio. In some embodiments, the mixing ratio may be at least 10 parts by volume of the diluent to one part by volume of the sample to form the dilution composition. The sample of the cell culture matrix may be mixed with the diluent without undergoing a precipitation process prior to the mixing. In some embodiments, the sample of the cell culture matrix may be mixed with the diluent without undergoing a centrifugation process prior to the mixing.

In one embodiment of the invention, a dilution module is provided for diluting a biological sample. The dilution module may include a first fluid channel for conveying a diluent flow from a first end to a second end thereof and a flow splitter connected to the second end of the first fluid channel for dividing the diluent flow into a first split flow and a second split flow. The dilution module further includes a first dilution valve having a first flow path, a second flow path, and a sample channel, wherein the first dilution valve is adjustable between a first condition and a second condition. The first and second flow paths of the dilution module may intersect in both of the first and second conditions, and the sample channel may intersect with one or more of the first and second flow paths only in the second condition of the first dilution valve. The dilution module also includes a first split flow channel for conveying the first split flow from the flow splitter to the first flow path, and a second split flow channel for conveying the second split flow from the flow splitter to the second flow path. Sample contained in the sample channel may be diluted by the diluent flow only when the first dilution valve is in the second condition, and a dilution ratio of diluent to sample is controllable by relative flow rates of the first and second split flows.

In some embodiments, a second flow resistance is less than 50% of a first flow resistance at equal flow rates. The first and second flow paths may be modified when the dilution valve is adjusted between the first and second conditions.

The dilution module may further include a third split flow that is divided from the diluent flow, and a second dilution valve having a first flow path, a second flow path, and a sample channel. The second dilution valve may be adjustable between a first condition and a second condition. The first and second flow paths of the second dilution valve may intersect in both of the first and second conditions of the second dilution valve, and the sample channel of the second dilution valve may intersect with one or more of the first and second flow paths of the second dilution valve only in the second condition of the second dilution valve. The dilution module may further include a third split flow channel for conveying the third split flow the flow splitter to the first flow path of the second dilution valve, and a transfer flow channel for connecting the second flow path of the first dilution valve to the second flow path of the second dilution valve.

In some embodiments, the transfer flow channel is arranged to convey diluted sample from the first dilution valve to the second flow path of the second dilution valve.

In another embodiment of the invention, a dilution module for diluting a sample includes a first dilution valve having a first flow path, a second flow path, and a sample channel. The first dilution valve may be adjustable between a first condition and a second condition. The first and second flow paths may intersect in the first dilution valve in both of the first and second conditions of the first dilution valve. The sample channel may intersect with one or more of the first and second flow paths only in the second condition of the first dilution valve to generate a diluted sample flow. The dilution module may further include a first fluid channel for conveying a first diluent flow to the first flow path, a second fluid channel for conveying a second diluent flow to the second flow path, means for motivating the first and second diluent flows, and a controller for adjusting the first dilution valve between the first and second conditions. The sample contained in the sample channel may be diluted by at least one of the first and second diluent flows only when the first dilution valve is in the second condition. A dilution ratio of diluent to sample is controllable by relative flow rates of the first and second diluent flows.

In some embodiments, the means for motivating the first and second diluent flows includes respective first and second pumps, with the first pump arranged for motivating the first diluent flow at a first flow rate, and the second pump arranged for motivating the second diluent flow at a second flow rate. In some embodiments, the second flow rate is greater than the first flow rate.

A method for processing a cell culture composition of cells and spent media includes:

(a) providing a processing apparatus having a dilution module and a filtration module having a filter with a molecular weight cutoff of no greater than 20,000 Daltons;

(b) obtaining a sample of the cell culture composition from a source;

(c) operating the dilution module to mix the sample of the cell culture composition with a diluent to form a dilution composition; and (d) passing the dilution composition through the filtration module in contact with the filter to remove constituents of the cell culture composition having a molecular weight that exceeds the molecular weight cutoff of the filter.

The method may further include passing the sample through a separation module prior to the dilution module, the separation module being effective to remove cells from the sample.

The spent media may include molecules having a molecular weight of greater than 25,000 Daltons.

The dilution module may be operated to mix the sample with the diluent at a mixing ratio of at least 10 parts by volume of the diluent to one part by volume of the sample to form the dilution composition.

The filter may comprise a porous membrane.

The method may further include selectively passing the dilution composition through the filtration module in a first flow direction into contact with a first side of the filter, and through the filtration module in a second flow direction into contact with a second side of the filter to backflush the filter.

The method may further include actuating a valve to selectively pass the dilution composition through the filtration module along the first or second flow directions.

The sample of the cell culture matrix may be mixed with a diluent without undergoing a precipitation process prior to the mixing.

The sample of the cell culture matrix may be mixed with a diluent without undergoing a centrifugation process prior to the mixing.

DETAILED DESCRIPTION OF THE INVENTION

The objects and advantages of the present invention referred to above together with other objects, features, and advances represented by the present invention will now be presented in terms of detailed embodiments described with reference to the attached drawing figures which are intended to be representative of various possible embodiments of the invention. Other embodiments and aspects of the invention are recognized as being within the grasp of those having ordinary skill in the art.

Figure 1:
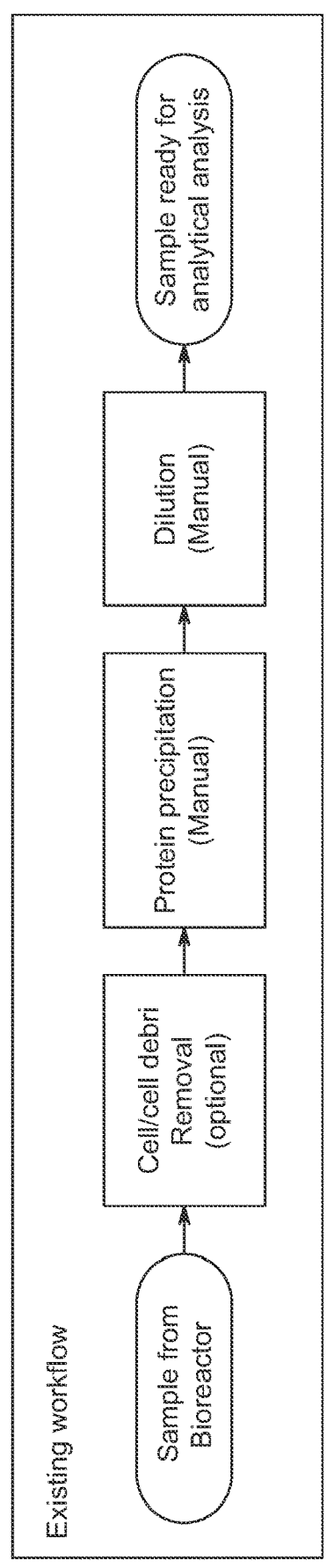
FIG. 1 is flow diagram of a prior art workflow for preparing biological samples for analysis.
Figure 2:
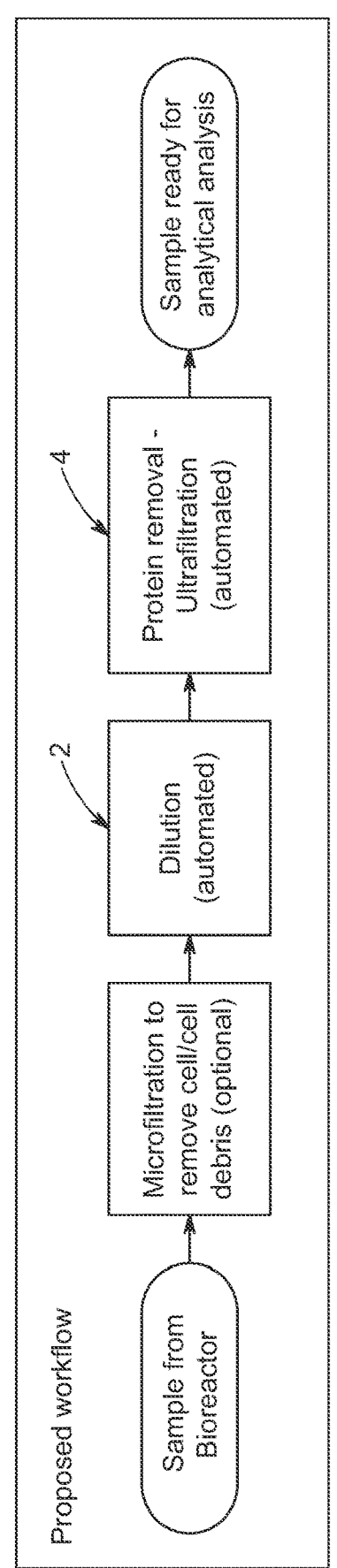
FIG. 2 is a flow diagram of a workflow of the present invention for preparing biological samples for analysis.

A significant change of the workflow introduced by the present invention is illustrated in FIG. 2, wherein the entire dilution process is conducted before the removal of the large protein molecules. One of the challenges of running the sample preparation is the limited sample volume that is available for analysis. Particularly for cell development processes, the bioreactor is small, so the sample quantity that can be removed from the bioreactor is low, often less than 100 uL. With such a small quantity of sample, the step of removing the large protein molecules in the existing workflow could easily introduce errors. By reversing the sequence and performing the dilution process (up to 200×-300× dilution) prior to protein removal, the sample size is greatly increased, from a 10 uL sample to 2 ml (200× dilution) or 3 ml (300×dilution). This large sample size is much easier to deal with in separation processes effective to remove protein molecules. Another advantage of diluting the sample first is to dilute the concentration of the large protein molecules. It is much easier to deal with low concentration of large molecules in solution when using the filtration processes as described hereinbelow. The sample is preferably diluted at a mixing ratio of at least 10 parts by volume of the diluent to 1 part by volume of the sample to form a dilution composition, preferably at least 50 parts by volume of the diluent to 1 part by volume of the sample to form the dilution composition, preferably at least 100 parts by volume of the diluent to 1 part by volume of the sample to form the dilution composition, and more preferably at least 300 parts by volume of the diluent to 1 part by volume of the sample to form the dilution composition.

After the dilution process to generate a suitable diluted sample volume (e.g. 2-3 ml), the next step is to remove the large protein molecules. The compounds of interest in biological samples typically have a molecular weight of less than 2000 Da. The large protein molecules contained in spent cell culture media usually exceed 50-60 kDa, with Monoclonal antibodies having molecular weight of about 150 kDa. In some embodiments, the spent media includes molecules having a molecular weight of greater than 25 kDa (25,000 Da) that are not of analytical interest.

Ultrafiltration filters have been widely used in bioprocessing. For cell culture medium/spent medium analysis, the large protein molecules are considered the "impurity" to remove. With an appropriately-selected filter, the relatively small molecular weight compounds of interest may pass through as collected filtrate, and the relatively large molecular weight proteins can be removed as retentate. It has been found that ultrafiltration filters having pore sizes ranging between 1,000 Da molecular weight cutoff (MWCO) and 0.1 μm pore size are effective in removing components from diluted samples. Selection of appropriate pore size filters within this range is important to remove only the molecules that are considered impurities to the final diluted sample.

The largest compounds that are typically of interest in biological cell culture media samples have a molecular weight of less than about 2,000 Da. Vitamin B12 has molecular weight of 1356 Da and L-Ascorbic acid 2-phosphate sesquimagnesium salt has molecular weight of 1634 Da. By contrast, the large protein molecules that need to be removed from the sample have a molecular weight of more than 50k-10k Da. Ultrafiltration filters with molecular weight cut-off (MWCO) of no greater than 20,000 Da are preferred in the filtration systems and methods of the present invention. In some embodiments, filters with an MWCO of 10,000, preferably 7,000, and more preferably 5,000 may be used. For the purposes hereof, the term "molecular weight cutoff" or "MWCO", means that 90% of the solutes with molecular weights exceeding the MWCO are rejected by the filter). The larger MWCO filter is, more large molecules may pass, but it requires less cross membrane pressure to drive the permeate through.

Figure 3:
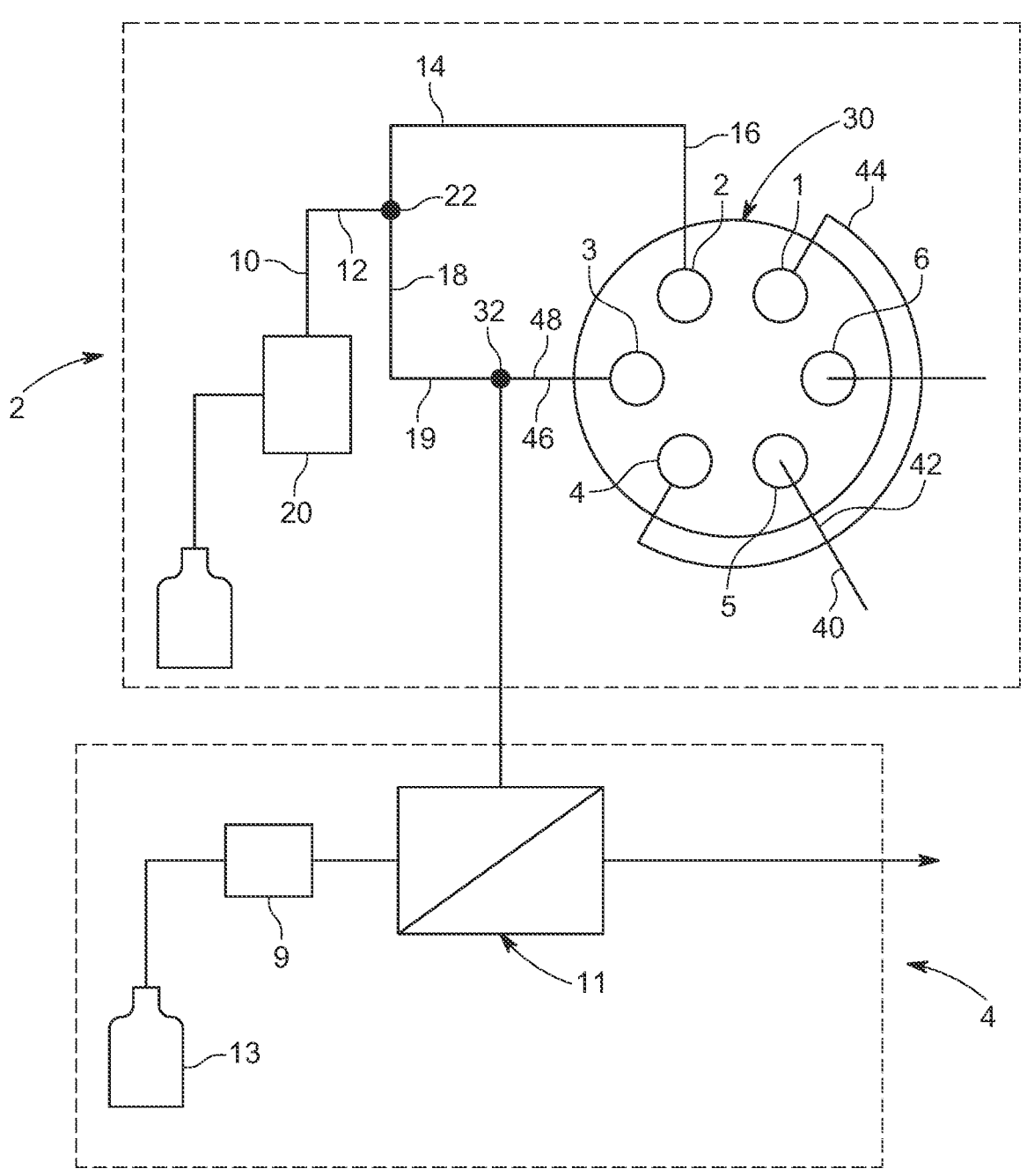
FIG. 3 is a schematic illustration of a sample preparation apparatus.

FIG. 3 shows a diagram of a proposed workflow system, with cell-free sample injection, including a dilution module 2 and a filtration module 4.

For a developed testing protocol, the dilution level of the sample might be pre-determined, and not changing for the same type of sample preparation. For this type of sample preparation, the dilution may be accomplished by splitting the diluent flow 10 from a pump 20 in a first fluid channel 12 through a flow splitter 22, such as a tee fitting, one or more valves, or other apparatus effective in dividing an inlet flow into two or more outlet flows. In the illustrated embodiment, the diluent flow 10 is therefore split into a first split flow 14 in a first split flow channel 16, and a second split flow 18 in a second split flow channel 19. The volumetric flow rate split ratio between the first split flow 14 and the second split flow 18 may be determined, for example, by the flow resistance difference experienced by the two streams.

To introduce a sample into the system, a dilution valve 30 is used and shown schematically in FIG. 3. A "2/6 injector valve", which has 6 ports and 2 positions, is widely used in HPLC applications for precise sample injection. In a "load" condition/position, diluent from first split flow 14 in first split flow channel 16 goes into dilution valve 30 through port 2, and a groove (not shown) in the rotor portion of dilution valve 30 fluidically links port 2 and port 3, so that the first split flow 14 goes in port 2 and out of dilution valve 30 through port 3. Sample 40 can be pushed (or pulled) into dilution valve 30 through a sample supply channel 42 at port 5, flowing to port 4 through a groove (not shown), through the sample loop/channel 44, and out of dilution valve 30 through port 6.

After the sample channel 44 is filled with sample 40, dilution valve 30 may be moved to an "inject" position/ condition to dilute the sample with diluent. Now, the first split flow 14 from first split flow channel 16 still goes into dilution valve 30 through port 2, but now it intersects with sample 40 in sample channel 44 to push sample 40 out from dilution valve 30 through port 3. This type of full fill mode sample injection introduces the same amount of sample 40 into the analysis downstream from dilution valve 30. The mixed sample stream 46 then meets with second split flow 18 at a flow junction 32.

To calculate the volumetric flow rate split ratio among first and second split flows 14, 18, the total flow resistance through the respective first and second split flow channels 16, 19, through dilution valve 30, and through mixed sample stream channel 48 must be calculated. For the second split flow 18, the flow resistance is from the tubing forming second split flow channel 19. For the mixed sample stream 46, the flow resistance is the summation of the flow resistance from the tubing forming first split channel 16, from the fluid flow paths through dilution valve and sample channel 44, and from the tubing forming mixed sample stream channel 48 from dilution valve 30 to flow junction 32. By careful design, the contribution of flow resistance from dilution valve 30 and sample channel 44 is much smaller than from second split flow channel 19. However, the flow resistance of mixed sample stream channel 48 is difficult to minimize. Since the flow rate through mixed sample stream 46 is typically very low relative to the flow rate through second split flow 18 (for high dilution levels), the tubing volume of mixed sample stream channel 48 should be as small as possible. At the same time, the flow resistance generated from this tubing should not be too high. Sample 40 may have very different viscosities from the diluent. If mixed sample stream channel 48 were to generate significant back pressure, then the dilution level at fluid junction 32 could change when the sample starts to fill in the tubing. For this configuration, the tubing for mixed sample stream channel 48 is preferably long enough (for example 20 cm) for physical connections. It is difficult to balance the need to minimize volume (small I.D. of tubing) and to reduce flow resistance (large I.D. of tubing).

Applicant has discovered that one solution to this challenge is to combine the two streams at dilution valve 30. The flow paths in the valve can be very short, and both low volume and low flow resistance can be achieved. An embodiment of the invention is schematically illustrated in FIGS. 4-8, which describes a 7-port dilution valve 130 that includes a groove 160 on the stator that links center port 162 to outlet port 164. Second split flow 118 goes into dilution valve 130 at center port 162 and is conveyed along second flow path 172 to mix with the first split flow 114 being conveyed along first flow path 170 in dilution valve 130. First and second split flows 114, 118 intersect at outlet port 164. Sample 140 is conveyed by sample supply channel 142 to a sample inlet port 145, and thereafter within dilution valve 130 through sample channel 144. In the "load" condition of dilution valve 130 schematically illustrated in FIGS. 5 and 7, sample is routed out from dilution valve 130 through sample outlet port 147. In the "injection" condition of dilution valve 130, illustrated in FIGS. 6 and 8, sample 140 in sample channel 144 is pushed out from sample channel 144 into passage 174 toward outlet port 164 by first split flow 114 conveyed along first flow path 170. The sample 140 and first split flow 114 intersect with second split flow 118 at outlet port 164 to further dilute sample 140. Passage 174 may be formed by a groove in the stator portion of dilution valve 130, and is preferably short in length. In some embodiments, passage 174 may be between 0.5-5 mm in length, and more preferably between 0.5-2.5 mm in length, and between 0.1-2.0 mm in width, and more preferably between 0.1-1.0 mm in width. Such dimensions mean that passage 174 exerts low flow resistance to fluid flow therethrough in a small total volume. Diluted sample is conveyed by diluted sample channel 182 from outlet port 164 of dilution valve to filtration module 4.

Since the diluent flowing in first and second split flows 114, 118 preferably is the same (viscosity is the same), by Poiseuille's equation, the flow resistance is directly proportional to the length (L) of the tubing comprising the respective flow channels and inversely proportional to the radius to the fourth power ($r^4$).

In an example of a 200× dilution with first split flow channel 114 being 40 cm long with 0.004" I.D., and second split flow channel 118 being 8 cm long with 0.010" I.D., the ratio of the flow resistance is $(0.01/0.004)4*40/8 \approx 5$. By calculating the ratio of flow resistance of the two flow channels, the resultant dilution level is about $(195+1)$: $1=196:1$. The flow resistance exerted by the sample channel 144 is comprised of the flow resistance through the valve ports and grooves, and is relatively small if the size of the ports and grooves are intentionally designed. For example, if sample channel 144 has an I.D. of 0.015" and length of 10 cm (corresponding to a sample size of 11.4 μL), the exerted flow resistance is $(0.01/0.015)*10/8 \approx 0.25$ of the second split flow channel 118, which is also very small compared with the flow resistance exerted by the first split flow channel 114. By designing this way, even with samples that have significantly different viscosity than the diluent, the change in the set dilution ratio would be minimal.

Given the relatively low flow resistance exerted by sample channel 144, as well as by the ports and grooves of dilution valve 130, in comparison to the flow resistances exerted by first and second split flow channels 116, 119, the volumetric flow rates of the system may primarily be controlled, in some embodiments, by the intentional sizing (length and I.D.) of first and second split flow channels 116, 119. As described above, it may be desired to accomplish a dilution ratio of diluent to sample that substantially dilutes the sample. Accordingly, the volumetric flow rate of the primary diluting flow (second split flow 118) should be substantially greater than the volumetric flow rate of the sample at the intersection point, which is driven in the "inject" condition of dilution valve 130 by first split flow 114 through first flow path 170. In some embodiments, therefore, the second split flow channel 119 exerts a second flow resistance that is less than a first flow resistance exerted by the first split flow channel 116 at equal flow rates, such that, in operation, the second flow rate is greater than the first flow rate. In some embodiments, the second flow resistance is less than 50% of the first flow resistance, preferably less than 30% of the first flow resistance, preferably less than 20% of the first flow resistance, preferably less than 10% of the first flow resistance, and preferably less than 5% of the first flow resistance. With decreased structural flow resistance of the second flow channel relative to structural flow resistance of the first flow channel comes increased fluid flow rate through the second flow channel relative to the fluid flow rate through the first flow channel. Thus, relative flow rates among the various flow channels can be engineered by the relative structural flow resistances of the respective flow channels.

Figure 9:
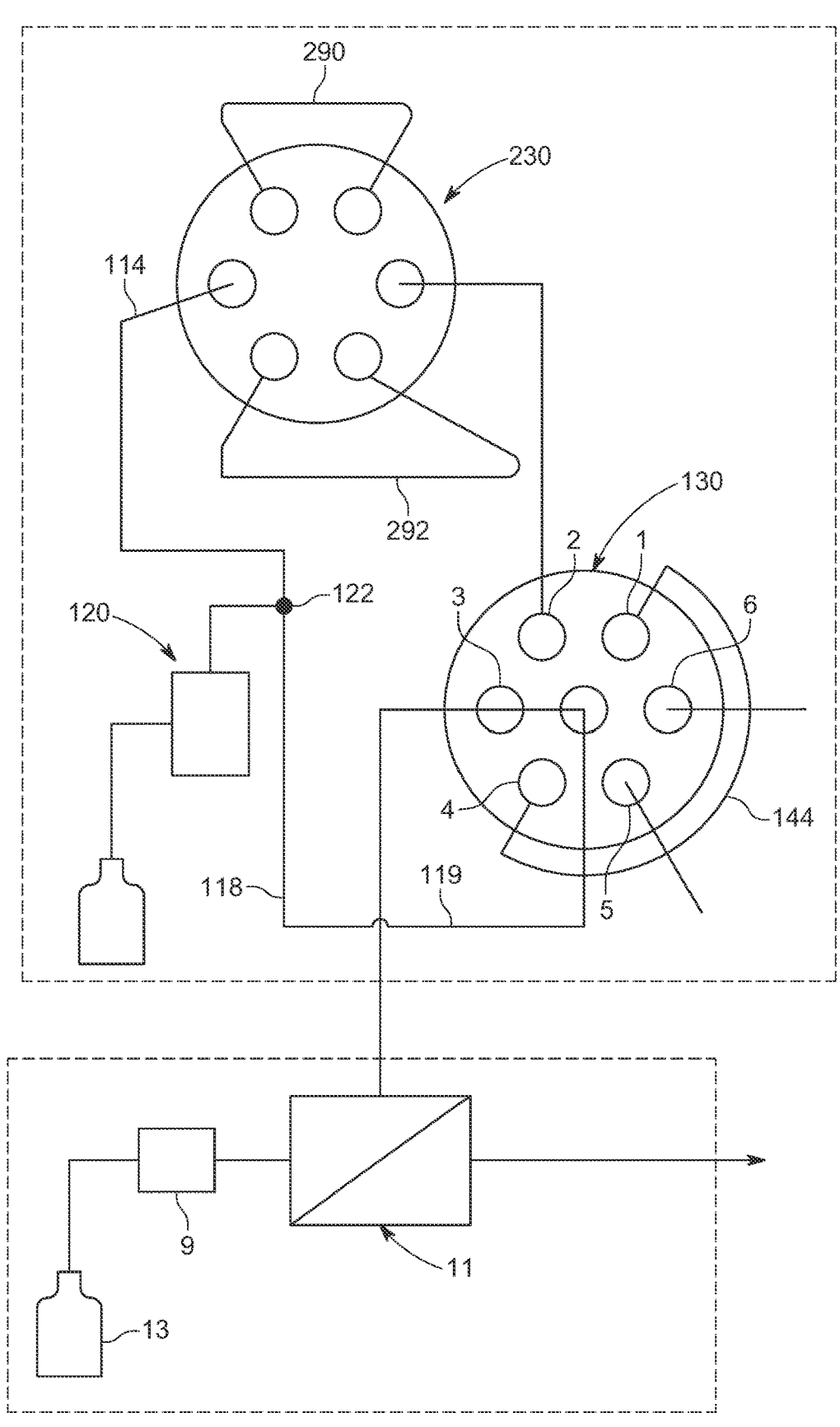
FIG. 9 is a schematic illustration of a sample preparation apparatus of the present invention.
Figure 10:
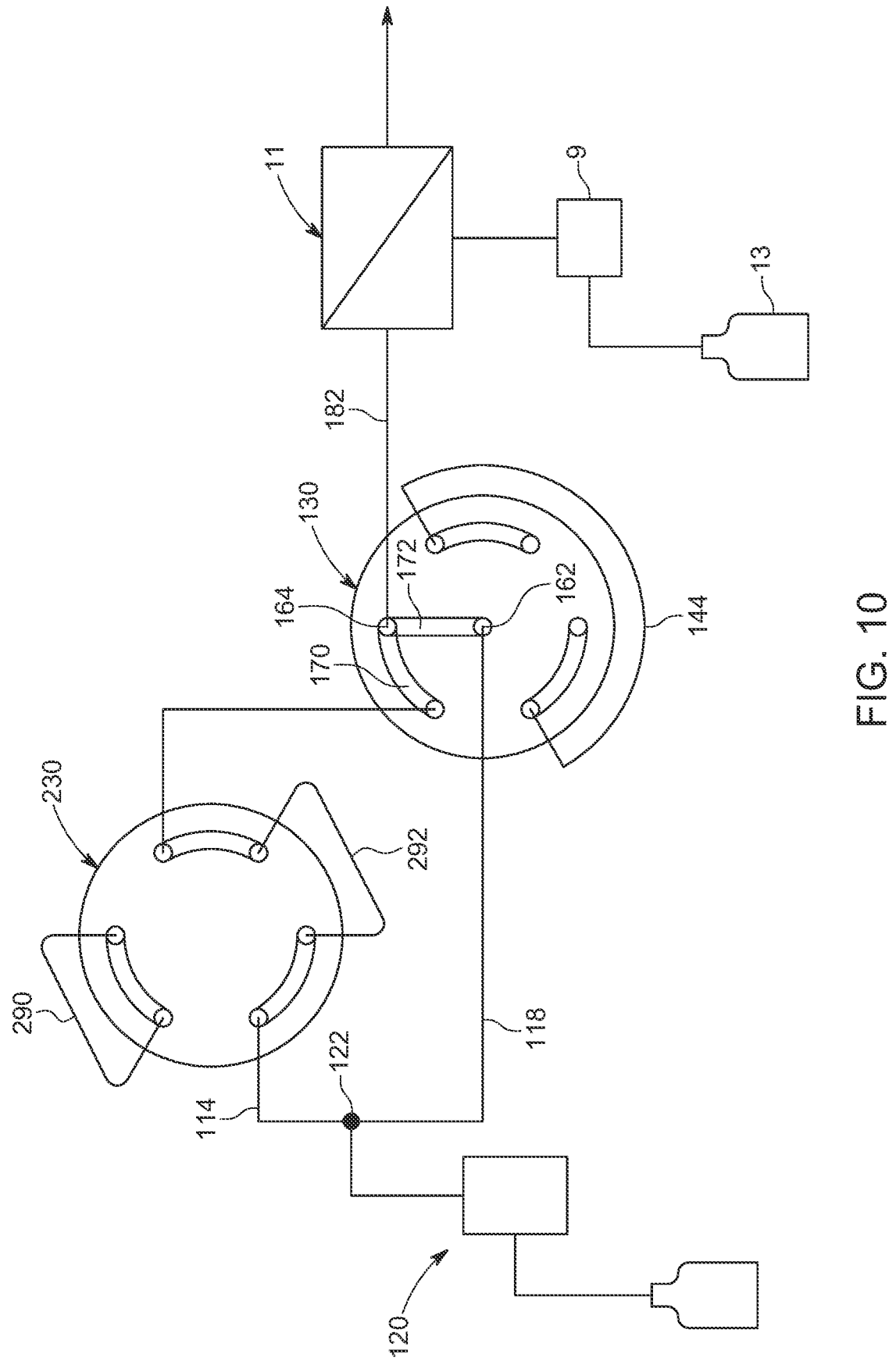
FIG. 10 is a schematic illustration of the sample preparation apparatus of FIG. 9 in a first condition.
Figure 11:
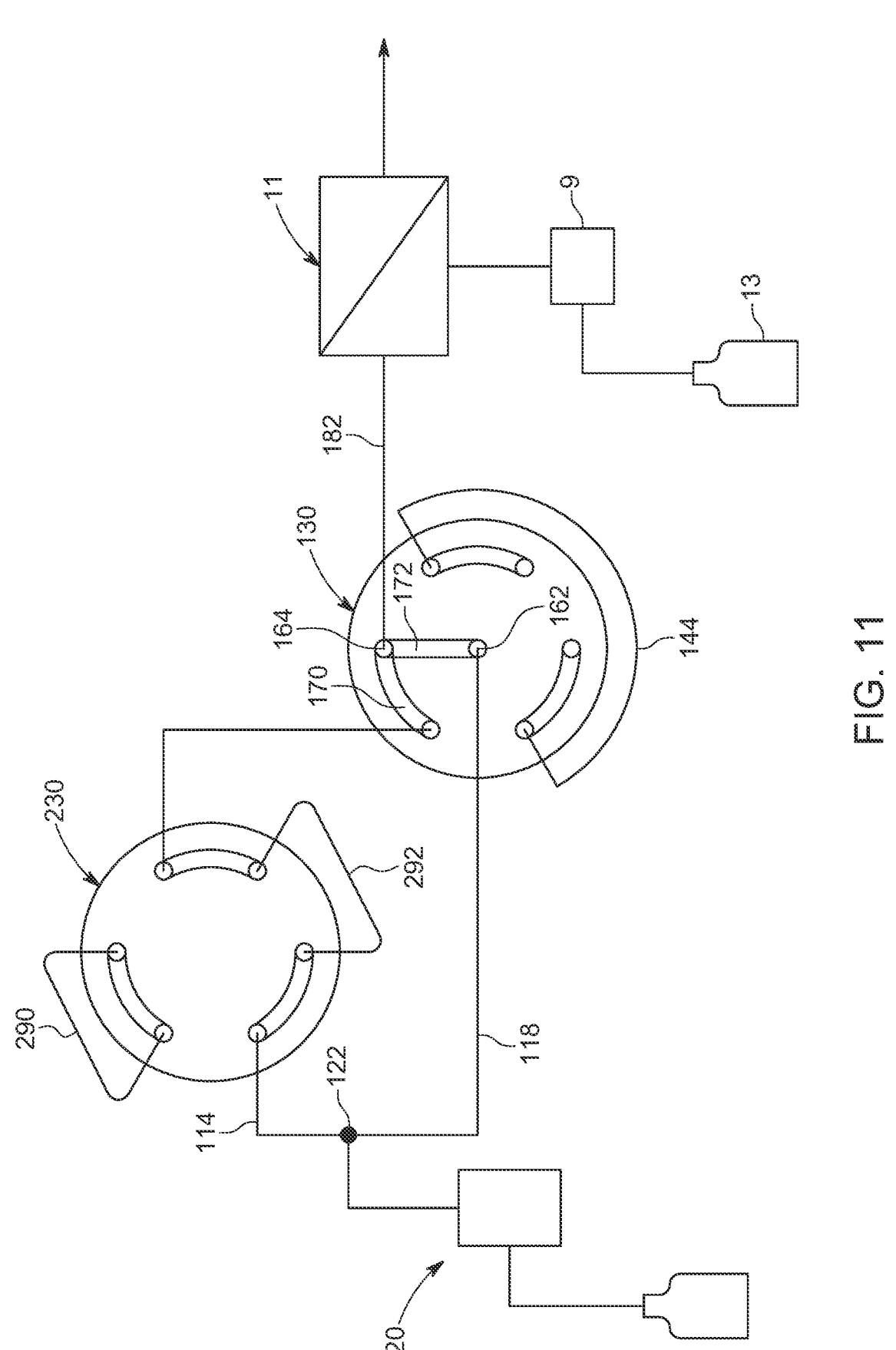
FIG. 11 is a schematic illustration of the sample preparation apparatus of FIG. 9 in a second condition.

To accommodate multiple dilution ratios, additional valves can be added to regulate flow resistance through the sample stream as schematically shown in FIGS. 9-11. In the illustrated embodiment, a second dilution valve 230 is used in the flow path of sample stream. Second dilution valve 230 includes first and second resistance channels 290, 292 that exert different degrees of flow resistance to first split flow

114. In a first position/condition of second dilution valve 230, as shown in FIG. 10, first split flow 114 is routed through first resistance channel 290 prior to entry into first dilution valve 130. In a second position/condition of second dilution valve 230, as shown in FIG. 11, first split flow 114 is routed through second resistance channel 292 prior to entry into first dilution valve 130. The different flow resistances exerted by first and second resistance channels 290, 292 result in different volumetric flow rates of first split flow 114, depending upon the position/condition of second dilution valve 230. The selectively different volumetric flow rates for first split flow 114 correspondingly selectively change the dilution ratio of the sample. First dilution valve 130 may be operated consistently with that described above, wherein first split flow 114 is conveyed by first flow path to, in the second condition of first dilution valve 130, mix and push sample in sample channel 144 into passage 174 and into intersection with second split flow 118 at outlet port 164. As described above, the flow resistance exerted from sample loop 144 and dilution valve 130 is relatively low, so that it would not significantly change the dilution level determined by solely the flow resistances exerted by each of first split flow channel 116, first resistance channel 290, second resistance channel 292, and second split flow channel 119. For a single pump system, because the dilution level is determined by the intrinsic properties of the two split flows, high pump accuracy and precision is not required.

Figure 12:
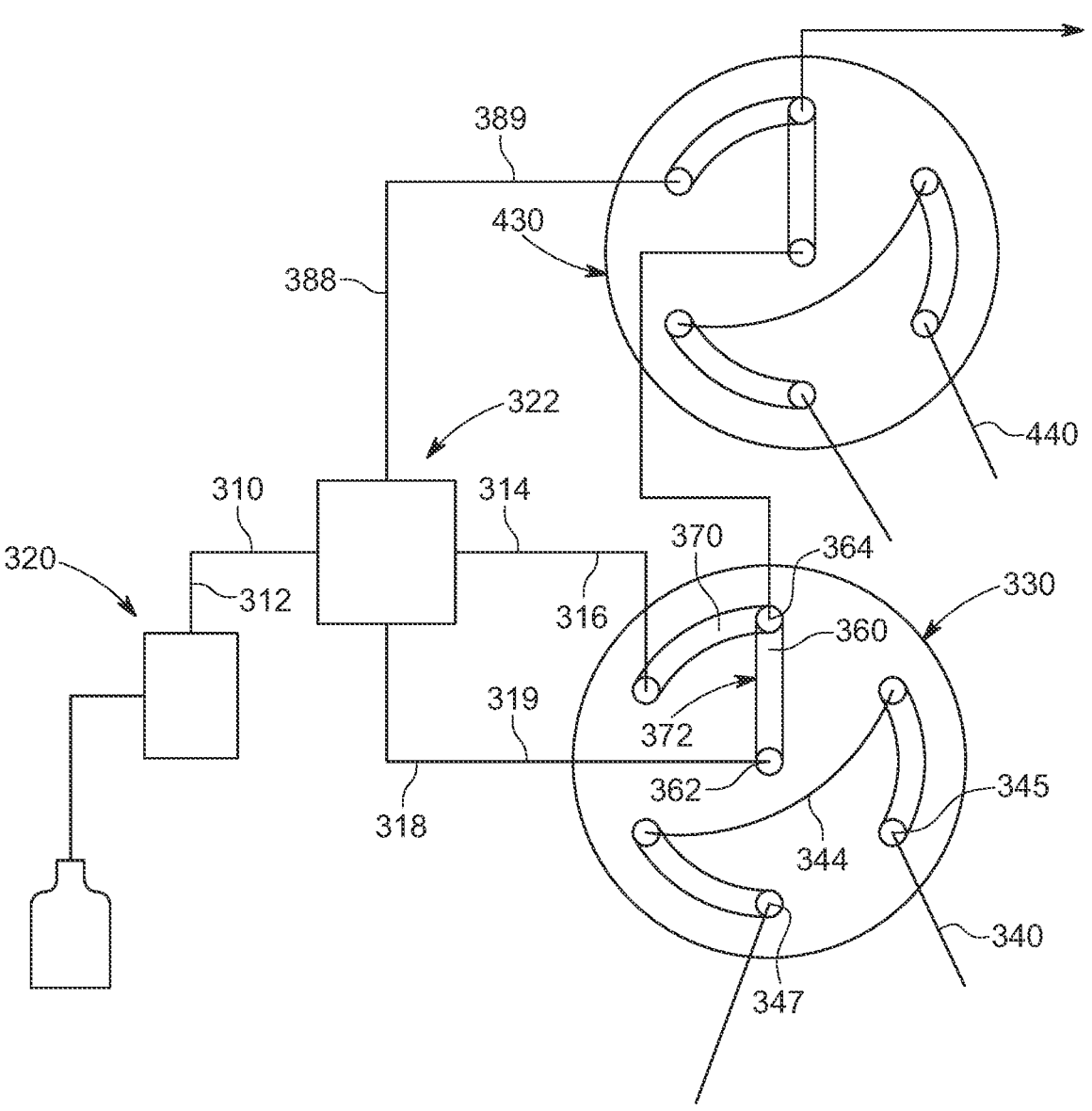
FIG. 12 is a schematic illustration of a sample preparation apparatus of the present invention in a first condition.
Figure 13:
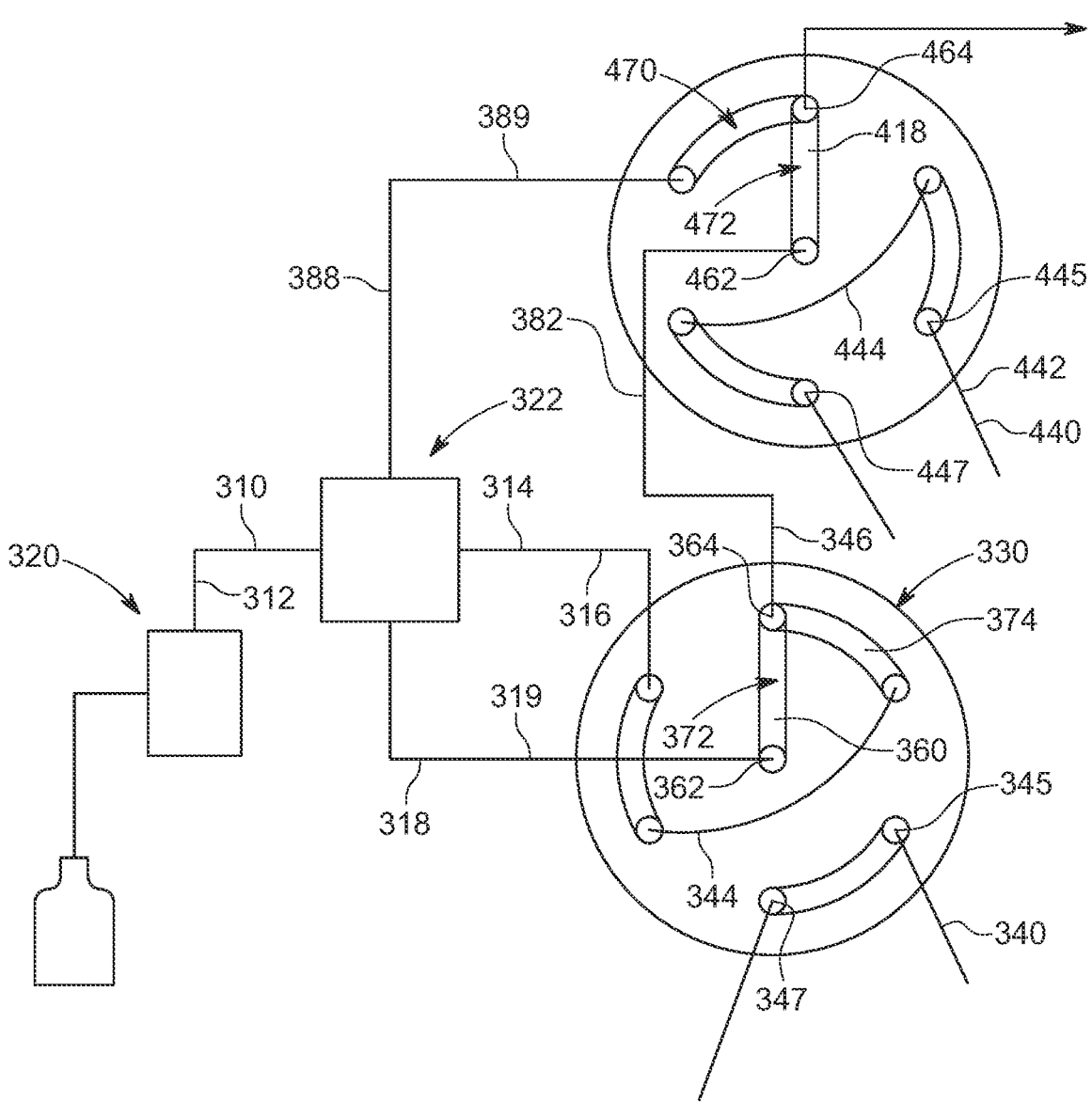
FIG. 13 is a schematic illustration of the sample preparation apparatus of FIG. 12 in a second condition.
Figure 14:
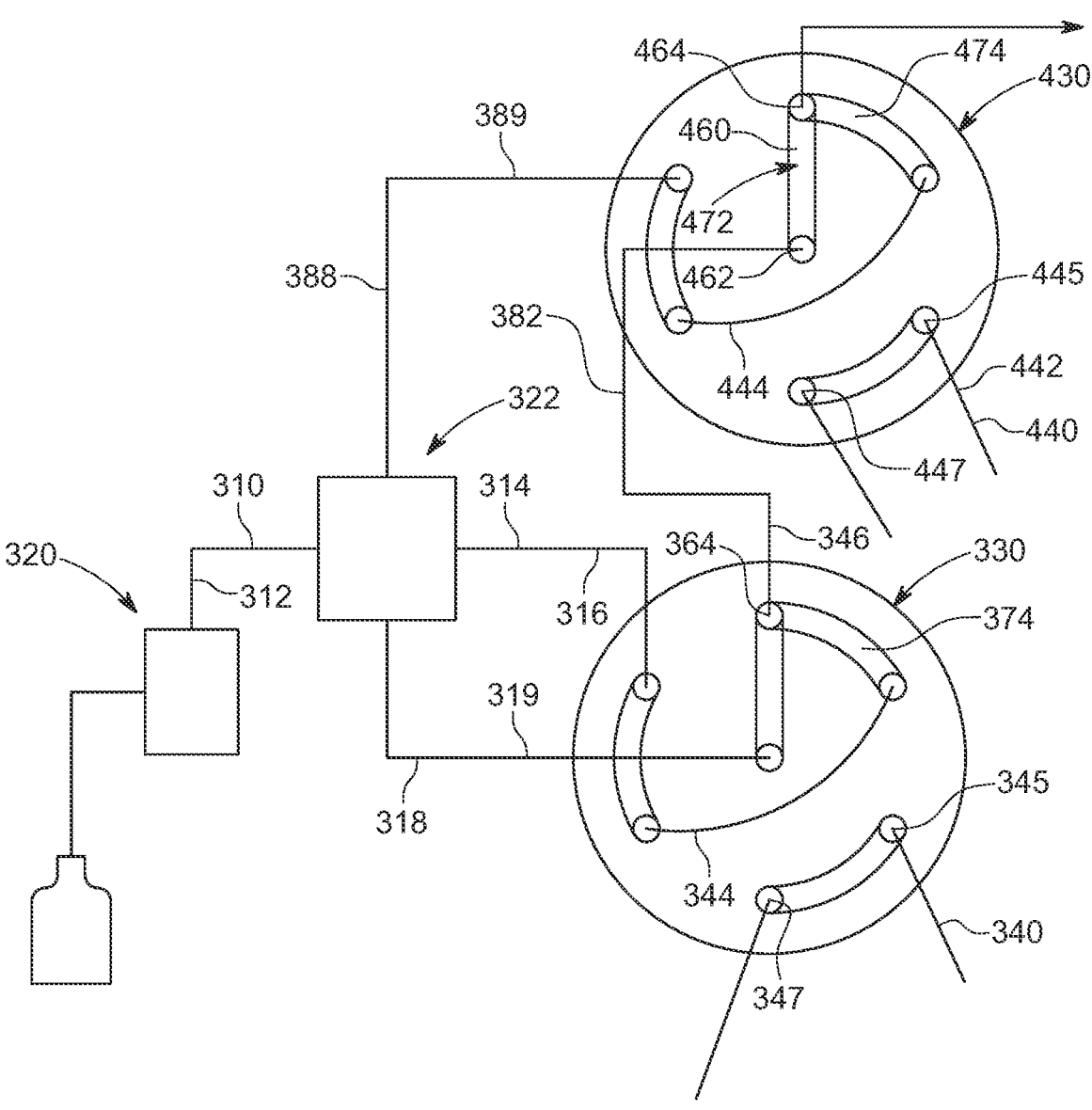
FIG. 14 is a schematic illustration of the sample preparation apparatus of FIG. 12 in a third condition.

A flow can be divided into more than two streams, and the flow rate for each stream can be determined by the flow resistance through each line. Dividing the diluent flow into more than two split flows could be helpful if more than one compound needs to be added to the diluent, such as an internal standard as well as a sample. An example embodiment for multiple split flows is illustrated in FIGS. 12-14. For this type of sample preparation, the dilution may be accomplished by splitting the diluent flow 310 from a pump 320 in a first fluid channel 312 through a flow splitter 322, which may be an apparatus effective in dividing an inlet flow into three or more outlet flows. In the illustrated embodiment, the diluent flow 310 is therefore split into a first split flow 314 in a first split flow channel 316, a second split flow 318 in a second split flow channel 319, and a third split flow 388 in a third split flow channel 389. The volumetric flow rate split ratio among the first split flow 314, the second split flow 318, and the third split flow 388 may be determined, for example, by the flow resistance difference exhibited through each of the respective flow channels.

To introduce multiple samples/internal standards into the system, a first sample 340 is introduced to first dilution valve 330 at sample supply channel 342. First dilution valve 330 may be analogous to dilution valve 130 described herein, such as a 7-port dilution valve that includes a groove 360 on the stator that links center port 362 to outlet port 364. Second split flow 318 is conveyed into first dilution valve 330 at center port 362 and is conveyed along second flow path 372 to mix with the first split flow 314 being conveyed along first flow path 370 in first dilution valve 330. First and second split flows 314, 318 intersect at outlet port 364 in a first condition of first dilution valve 330, as shown schematically in FIG. 12. First sample 340 is conveyed by sample supply channel 342 to a sample inlet port 345, and thereafter within first dilution valve 330 through sample channel 344. In the "load" condition of first dilution valve 330 schematically illustrated in FIG. 12, first sample 340 is routed out from first dilution valve 330 through sample outlet port 347. In the "injection" condition of first dilution valve 330, illustrated in FIGS. 13 and 14, first sample 340 in sample channel 344 is pushed out from sample channel 344 into passage 374 toward outlet port 364 by first split flow 314 conveyed along first flow path 370. First sample 340 and first split flow 314 intersect with second split flow 318 at outlet port 364 to further dilute first sample 340. Passage 374 may be formed by a groove in the stator portion of first dilution valve 330, and is preferably short in length. In some embodiments, passage 374 may be between 0.5-5 mm in length.

After sample channel 344 is filled with first sample 340, first dilution valve 330 may be moved to an "inject" position/condition to dilute the sample with diluent, as shown in FIG. 13. In the "inject" condition of first dilution valve 330, the first split flow 314 from first split flow channel 316 intersects with first sample 340 in sample channel 344 to push first sample 340 out from first dilution valve 330 outlet port 364 as a first diluted sample flow 346 along first outlet channel 382 toward second dilution valve 430. First diluted sample flow 346 may be conveyed to a center port 462 of second dilution valve 430, wherein a groove 460 on the stator links center port 462 to outlet port 464. Diluted sample flow 346 is conveyed along second flow path 472 to mix with the third split flow 388 being conveyed along third flow path 470 in second dilution valve 430. Third split flow 388 and diluted sample flow 346 intersect at outlet port 464 in a first condition of second dilution valve 430, as shown schematically in FIG. 13. Second sample 440 is conveyed by sample supply channel 442 to a sample inlet port 445, and thereafter within second dilution valve 430 through sample channel 444. In the "load" condition of second dilution valve 430 schematically illustrated in FIG. 13, second sample 440 is routed out from second dilution valve 430 through sample outlet port 447. In the "injection" condition of second dilution valve 430, illustrated in FIG. 14, second sample 440 in sample channel 444 is pushed out from sample channel 444 into passage 474 toward outlet port 464 by third split flow 388 conveyed along first flow path 470. Second sample 440 and third split flow 388 intersect with diluted sample flow 346 at outlet port 464 to dilute/mix second sample 440 in diluted sample flow 346. The mixed sample stream 398 then exits from second dilution valve 440 for downstream processing, such as through an analytical instrument.

Figure 15:
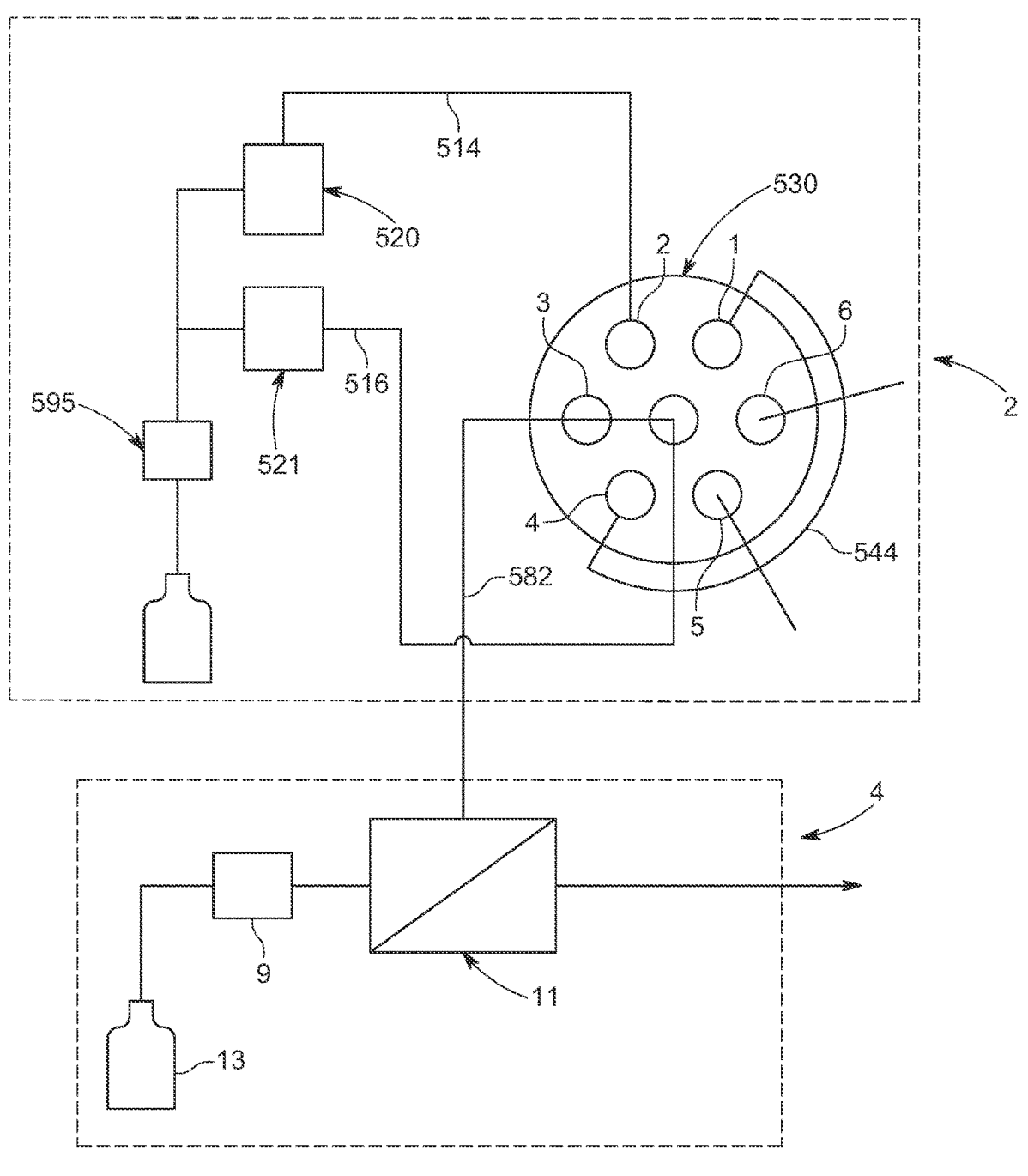
FIG. 15 is a schematic illustration of a sample preparation apparatus of the present invention.

In some embodiments, multiple pumps may be used to control the sample dilution. As illustrated in FIG. 15, first and second fluid pumps 520, 521 may be employed to motivate first split flow 514 and second split flow 518, respectively, through dilution valve 530. A diluent flow 510 may be divided upstream from first and second fluid pumps 520, 521 by a flow splitter (not shown). A degassing module 595 may be employed to remove gas bubbles from diluent flow 510 prior to introduction to first and second pumps 520, 521, particularly in the circumstance that the relative volumetric flow rates of first and second split flows 514, 518 are controlled primarily by pumping rates instead of the flow channel restrictions as described above. Gas bubbles can introduce pumping errors, so it is advantageous to remove gas bubbles in the flow channels upstream from the pumps.

Figure 16:
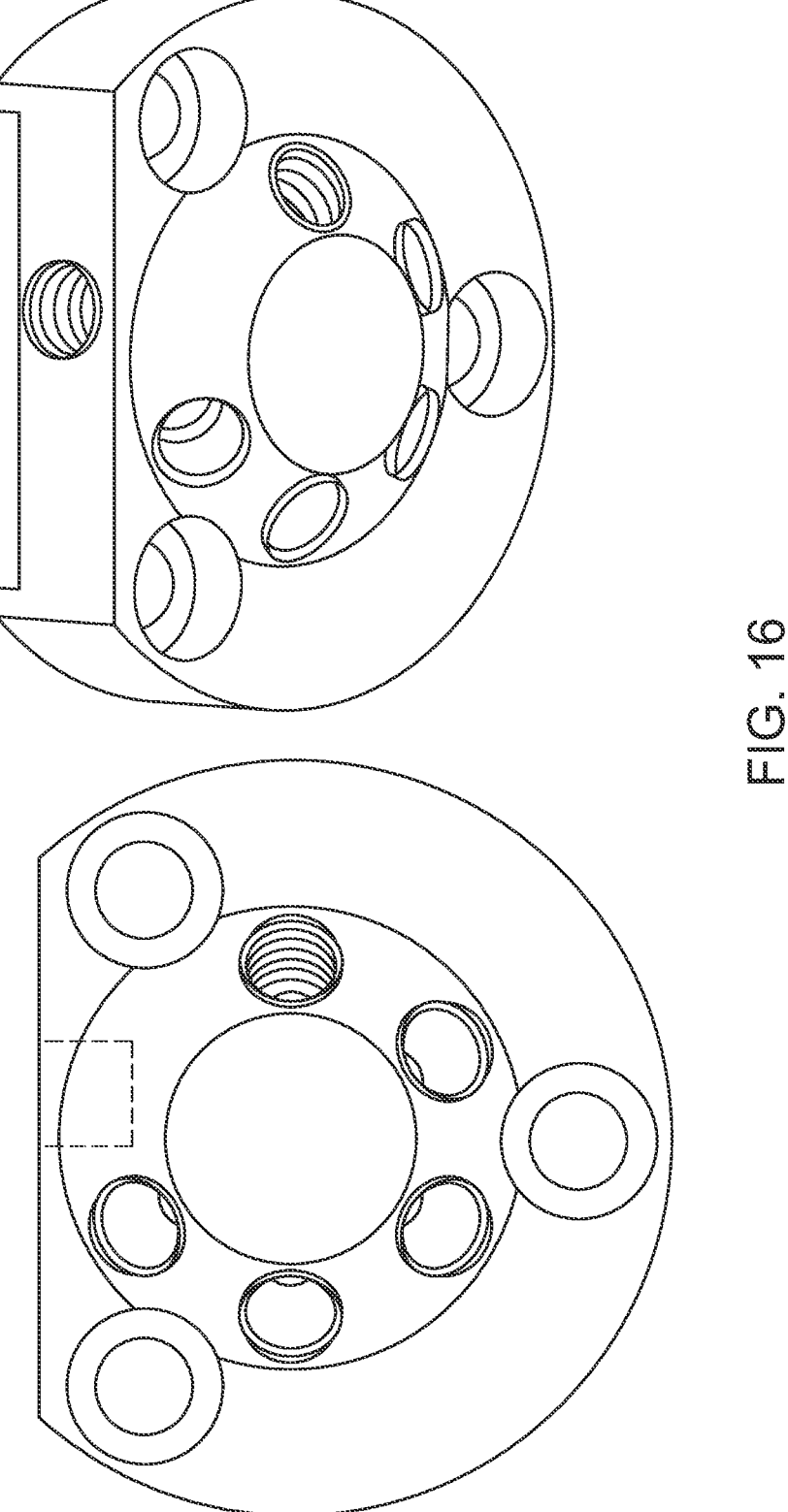
FIG. 16 is an illustration of a valve portion of a sample preparation apparatus of the present invention.

With the different configuration options of dilution modules, an appropriate dilution level can be achieved continuously and online. Although the embodiment illustrated in FIG. 15 depicts a single pump per split flow, it is contemplated that any number of pumps, such as two or more pumps 520, 521 may be employed to precisely control the diluent volumetric flow rates through respective split flows 514, 516. In this manner, volumetric flow rate is controlled by the pumping rate of the pumps, wherein the system may be arranged to provide continuous flow at desired rates to achieve continuously controllable sample dilutions. If for example, the configuration of FIG. 15 is used, with a sample size of 11.4 μL, and a dilution of 196×, the diluted sample size becomes 2.234 ml. With flow at 1 ml/min, more than 2 minutes of continuously flowing sample may be processed in the filtration module. The sample size may be adjusted by using different sample loops or the valve can be modified and used in a common autosampler. One change could be that a sample loop port of the valve becomes a vertical port (as shown in FIG. 16). With the vertical port, the autosampler needle may be inserted into the port, and shorten the distance that the sample needs to travel to the mixing location (outlet port 164). With the autosampler design, the sample quantity can be easily adjusted as needed.

After the sample is diluted and continuously flows out from the dilution module 2, a filtration module 4 receives the diluted sample solution and directs the sample solution into contact with a filter 11 to remove constituents of the diluted sample solution that are larger than a threshold size. Typically, filters useful in filtration module 4 may screen out constituents larger than a specified molecular weight, such as in a molecular weight cut-off (MWCO). As described above, filters with a MWCO of, for example, less than 20,000 Daltons may be useful to block the large protein molecules found in spent media of cell culture media, and to permit through the low molecular weight compounds of interest for spent media analysis. In the illustrated embodiments, filtration module 4 has an inlet 6 to receive the diluted sample solution from dilution module 2, a filtrate outlet 7 to convey material that passed through the filter to a sample collection or analysis, and a retentate outlet 8 to convey material blocked by the filter to waste 13. Pressure within the retentate side of the filter may be monitored by a pressure transducer 9.

For this new workflow, an ultrafiltration filter is preferably used to purify the diluted sample solution (as in microfiltration usage) by blocking the large protein molecules, and by permitting the small molecule compounds to pass. It is not a requirement of the systems of the present invention to exhibit very low breakthrough of the large protein molecules, since downstream analytical instrumentation such as liquid chromatograph-mass spectrometer or CE-MS will perform the separation as well. As with all filtration, there is a balance among filter type, surface area and pressure applied on the filter. The larger pore size filter used, the less surface area and pressure it needs to achieve a fast separation, however, more large molecules would break through. If a small pore size filter is selected, larger surface area or higher applied pressure is required to achieve fast separation.

An example filtration module 4 is a crossflow (also called tangential flow filtration (TFF) design) module, with 2 ports on the retentate side (1 inlet and 1 retentate side outlet) and 1 or 2 ports on the filtrate side. Diluted sample is fed into filtration module 4 through the inlet 6. The diluted sample solution flows across the filter, with the portion of the solution being small molecules and the diluent flowing through the filter to become the filtrate. Molecules larger than the cut-off size are blocked by the filter, and become retentate. A pressure transducer 9 is positioned on the retentate side to regulate the ratio of filtrate flow rate to the retentate flow rate. With a defined filter type, pore size (MWCO) and surface area, the flow resistance of a solvent through the filter at a flow rate can be measured and determined. For example, for a 6 cm$^2$ surface area Sartorious Hydrosart 10K filter running about 1 ml/min water generates about 27 psig flow resistance. We can attach a 25 cm long tubing with 0.005" ID after the transducer, which would generate about 75 psig at 1 ml/min. If there is no significant flow resistance contribution from other tubing/connectors after the filter, the ratio of the flow split to filtrate over retentate is $(75+14.5):(27+14.5){\approx}2.2$. Therefore, for a 1 ml/min total flow rate, the retentate flow rate is about $1/(1+2.2){\approx}0.31$ ml/min, and the filtrate flow rate is about 0.69 ml/min. The back pressure of the tubing can also be characterized the relationship between flow rate and back pressure. Since the pressure transducer may be positioned just before the calibrated tubing, the retentate flow rate is determined by knowing the pressure reading and fitting the linear model of flow rate and back pressure (Poiseuille's equation), if the viscosity of the liquid does not change significantly. In the instance that a high dilution level is applied to the sample (200-300×), even though the retentate is concentrated compared with the original dilution, it is still about 50× diluted if a quarter of the flow becomes retentate. With such dilution level, it is reasonable to just assume the viscosity of the diluent as the viscosity for all the calculations. This pressure reading can also be used as an indicator of whether the filter has significant fouling, which would cause higher flow resistance through the filter, and would change the ratio of retentate to filtrate flow rates.

Figure 17:
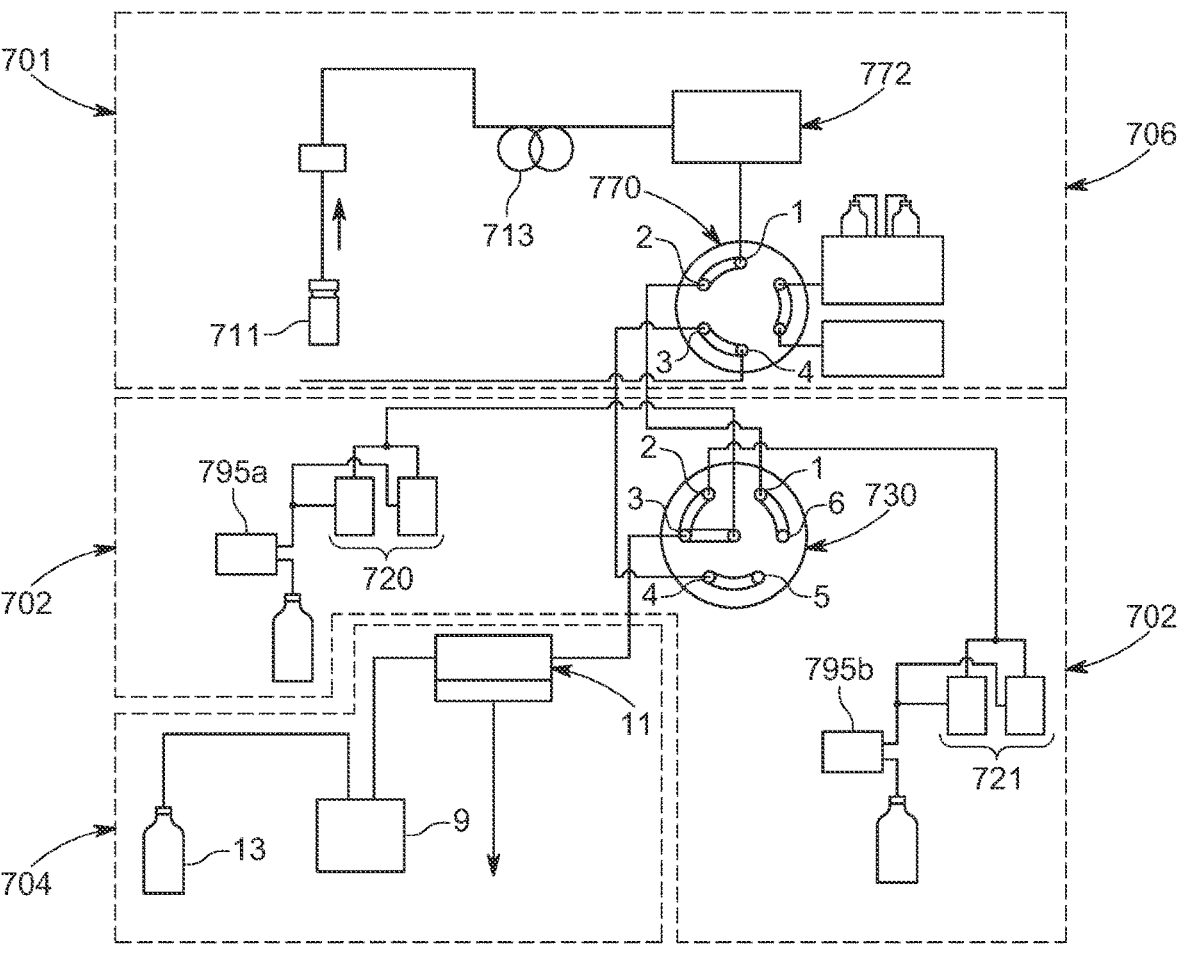
FIG. 17 is a schematic illustration of a sample preparation apparatus of the present invention.

In some embodiments, dilution/filtration processes may be employed in combination with autosampler devices, which are known and commonly used in sample preparation and analysis systems. This may be particularly true in applications involving multiple sample analyses. Example arrangements of the present invention utilizing autosampler devices for various and multiple purposes in sample preparation, delivery, and collection are schematically illustrated in FIGS. 17-25. System 701, as illustrated in FIG. 17, includes an autosampler module 706, a dilution module 702, and a filtration module 704. Autosampler module 706 includes an injection valve 770 that may be actuated between a "load" condition and an "inject" condition, and a metering pump 772 to drive sample into a sample loop 713 of injection valve 770. The injection valve 770 and sample loop 713 of autosampler module 706 may be fluidically connected to dilution module 702 as described herein to automate sample injection into dilution valve 730 of dilution module 702. In some embodiments, sample analysis time may be longer than a time period required to prepare the sample, such that sample preparation may be initiated after a prior sample has begun the analysis process.

Figure 18:
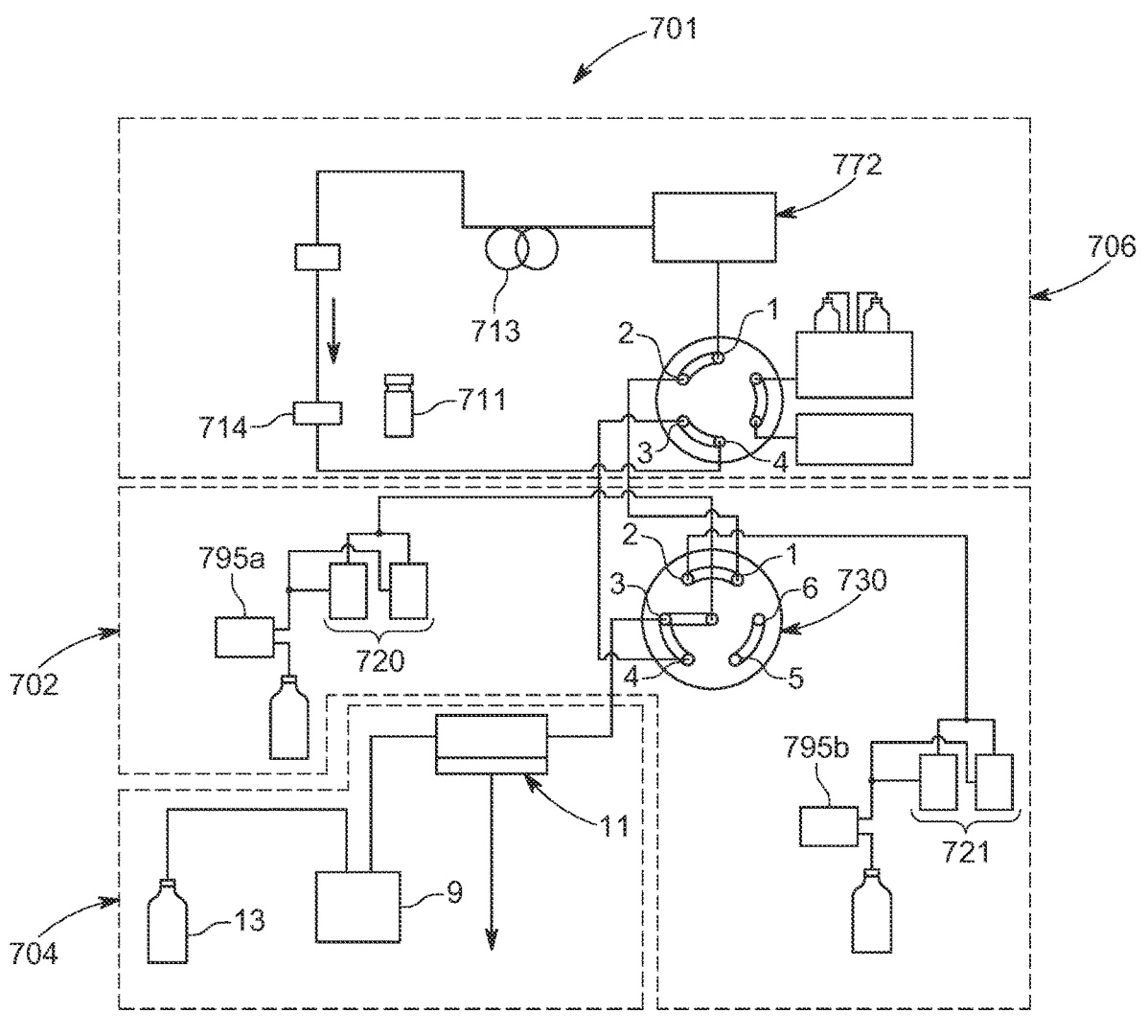
FIG. 18 is a schematic illustration of a sample preparation apparatus of the present invention.

FIG. 17 illustrates an initial arrangement of system 701 for driving sample from sample reservoir 711 into sample loop 713 with metering pump 772. Dilution valve 730 of dilution module 702 may be operated as described above with respect to dilution valve 130 to flush dilution module 702 with diluent. Once the sample has been drawn or driven into sample loop 713, diluent from dilution module 702 may be driven, for example by second pump 721, through ports 2 then 1 of dilution valve 730, and through ports 2 then 1 of injection valve 770 to drive the sample through injection port 774, though ports 4 then 3 of injection valve 770 to port 4 of dilution valve 730. This arrangement is illustrated in FIG. 18. Sample delivered to port 4 of dilution valve 730 is analogous to sample manually delivered to port 4 of dilution valve 130, as described above, wherein the sample fills sample loop 144 between ports 4 and 1 of dilution valve 730 while dilution valve 730 is in a "load" condition. Sample filling sample loop 144 may be combined with diluent at port 2 of dilution valve 730 when dilution valve 730 is switched to an "inject" condition.

It is contemplated that the designated pump or pumps, such as second pump 721, may be operated as needed to obtain the desired performance of system 701. For example, second pump 721 may be operated at a relatively high flow rate to compensate for the additional volume introduced to the system between injection valve 770 and dilution valve 730 in comparison to manually supplying sample directly to dilution valve 730. Second pump 721 may then be slowed to a flow rate appropriate for the selected dilution level at dilution valve 730. It is further to be understood that the selected pump fluidically connected to autosampler module 706 may be used to clean sample loop 713, injection port 774, and injection valve 770 with diluent.

Figure 19:
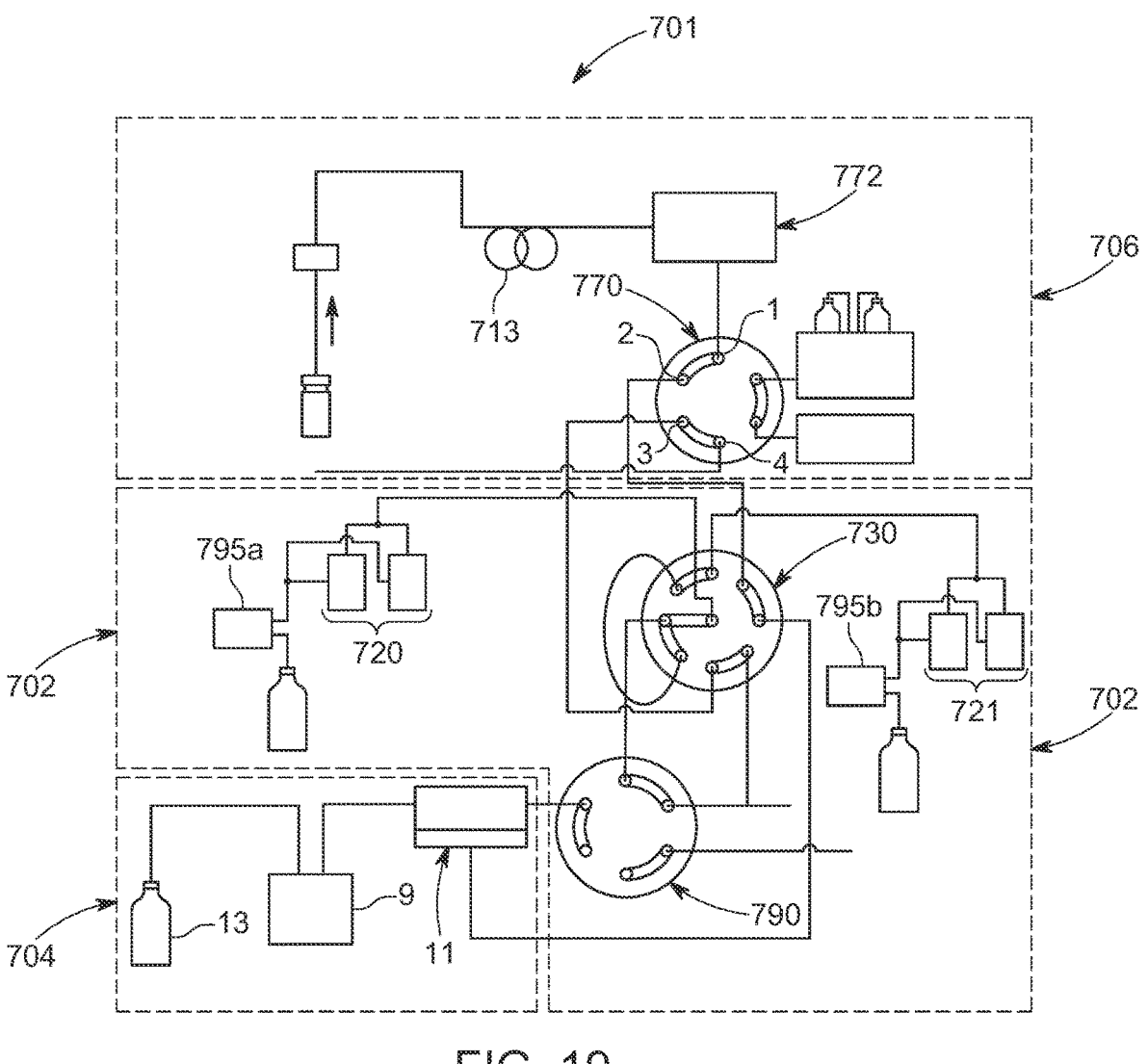
FIG. 19 is a schematic illustration of a sample preparation apparatus of the present invention.
Figure 20:
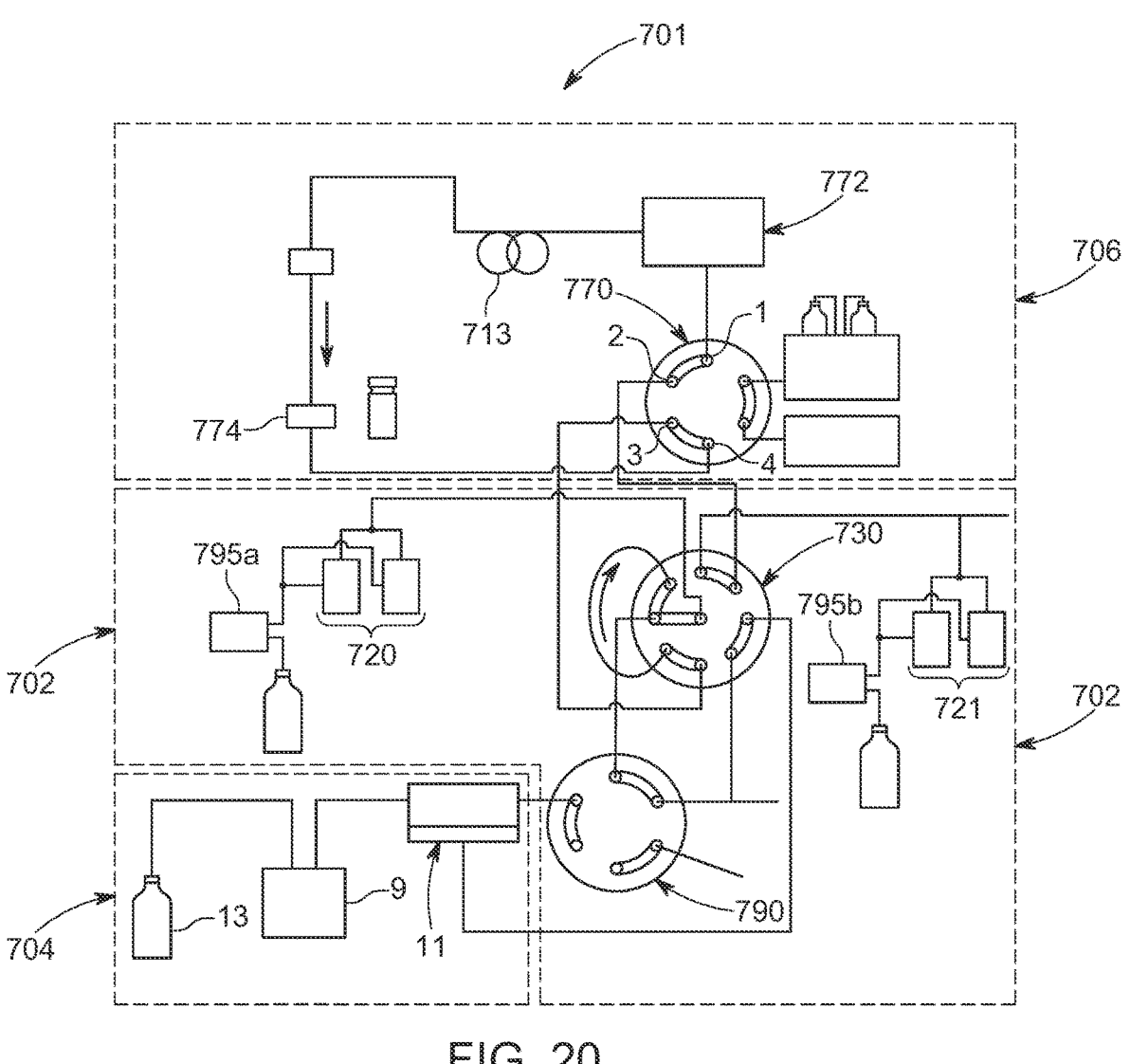
FIG. 20 is a schematic illustration of a sample preparation apparatus of the present invention.
Figure 23:
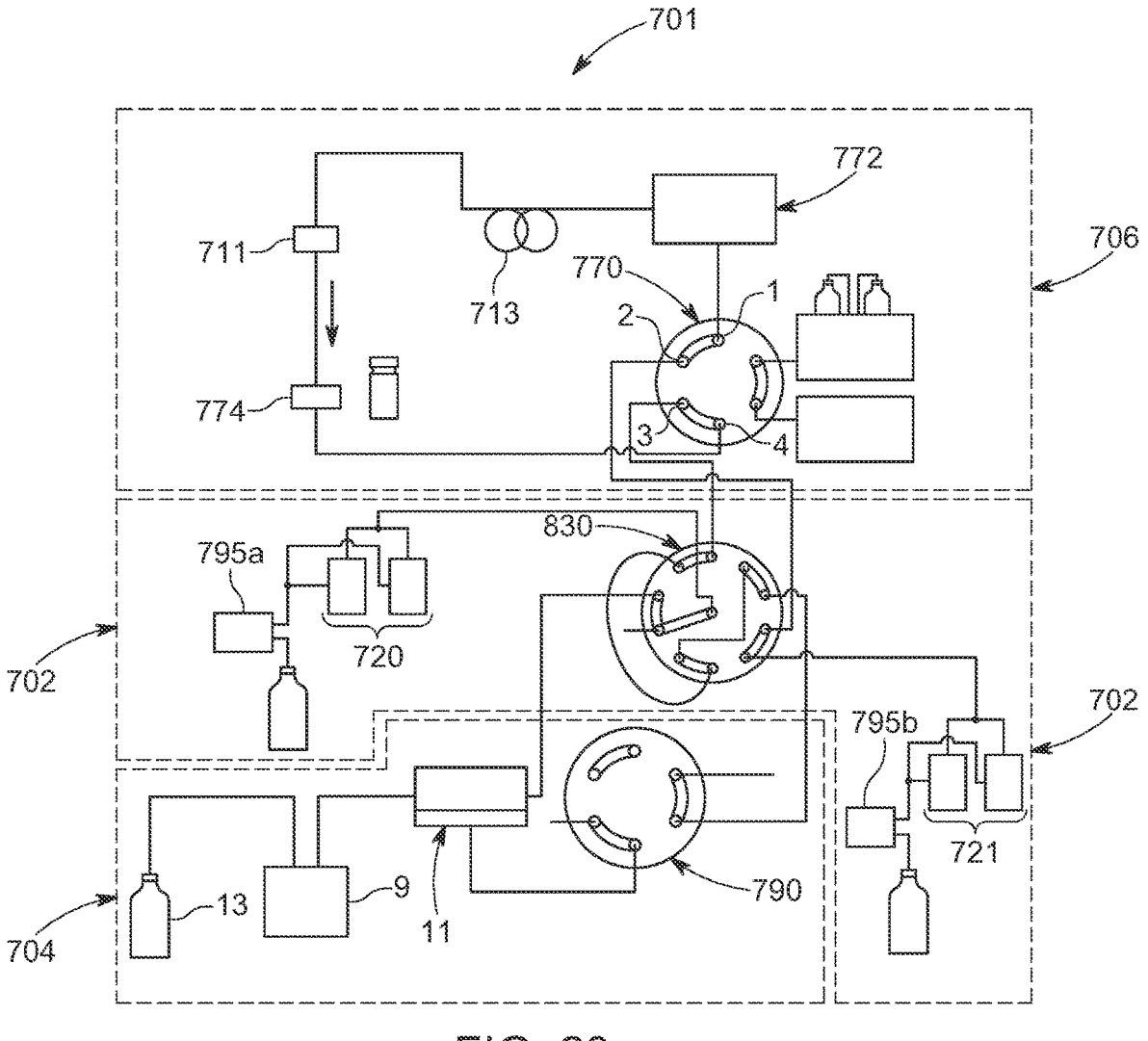
FIG. 23 is a schematic illustration of a sample preparation apparatus of the present invention.

The embodiment illustrated in FIGS. 19 and 20 utilizes a 9-port dilution valve 730 along with a purge valve 790 between dilution module 702 and filtration module 704. Similarly to the embodiment of FIGS. 17 and 18, sample is provided to dilution valve 730 from autosampler module 706. However, filtrate from filtration module 704 may be recovered as diluted sample by autosampler module 706 for downstream analysis. FIG. 23 illustrates charging sample loop 713 with sample by operating metering pump 772. FIG. 20 illustrates the next step of driving diluent from dilution module 730 to correspondingly drive sample through injection port 774, through ports 4 then 3 of injection valve 770 to dilution valve 730. Purge valve 790 may be switched to a load condition from a waste condition in order to introduce the diluted sample to filtration module 704.

Figure 21:
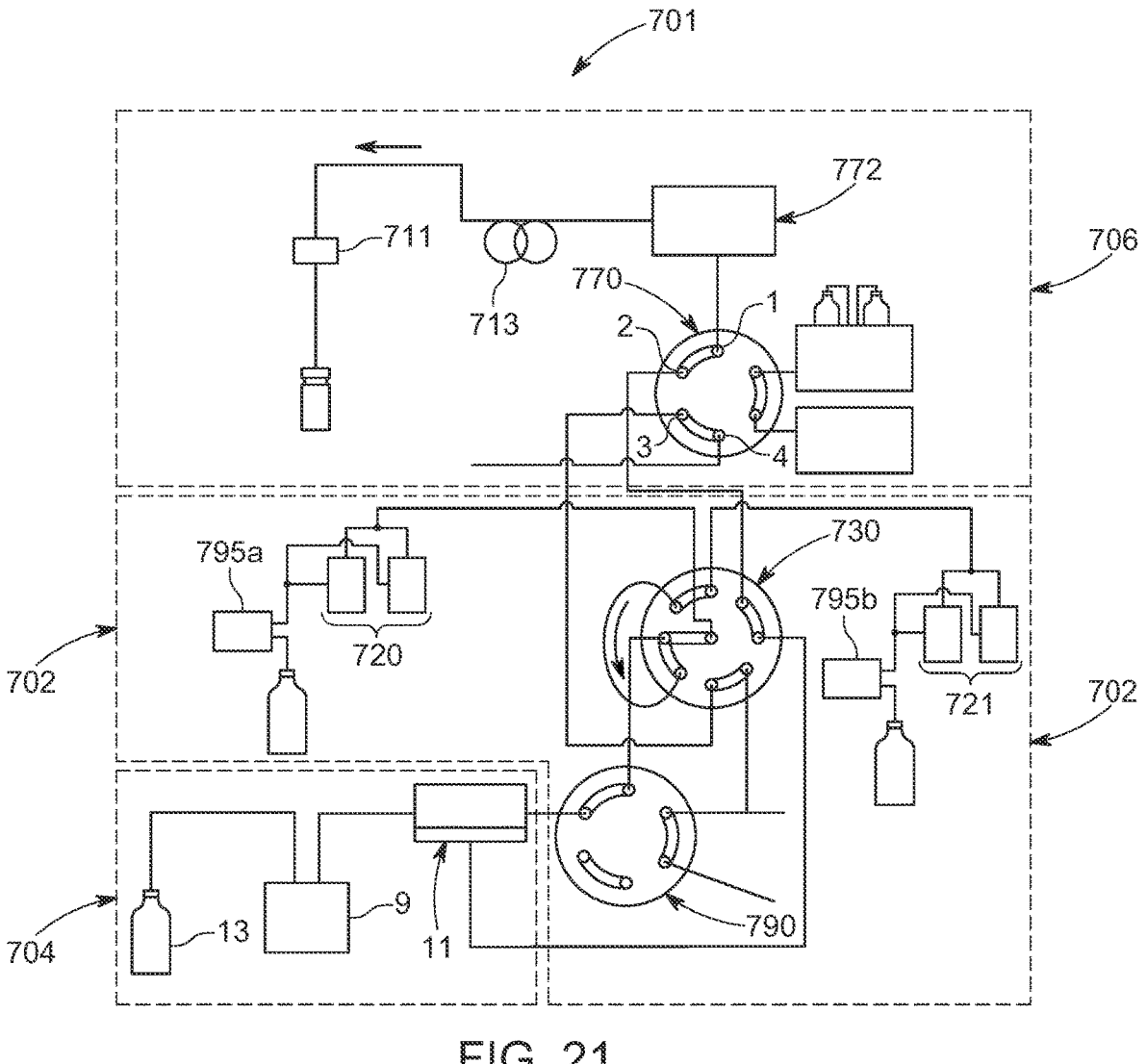
FIG. 21 is a schematic illustration of a sample preparation apparatus of the present invention.

As shown in FIG. 21, filtrate from filtration module 704 may be recovered by autosampler module 706 through dilution valve 730 of dilution module 702. The recovered diluted and filtered sample may preferably be driven through sample loop 713 to needle 711, which can be operated to move to selected sample vials for collecting timed fractions of the recovered sample. Autosampler module 706 may be cleaned with diluent by operation in the arrangement of FIG. 20 with one or more pumps driving diluent to and through autosampler module 706 through dilution valve 730.

Figure 22:
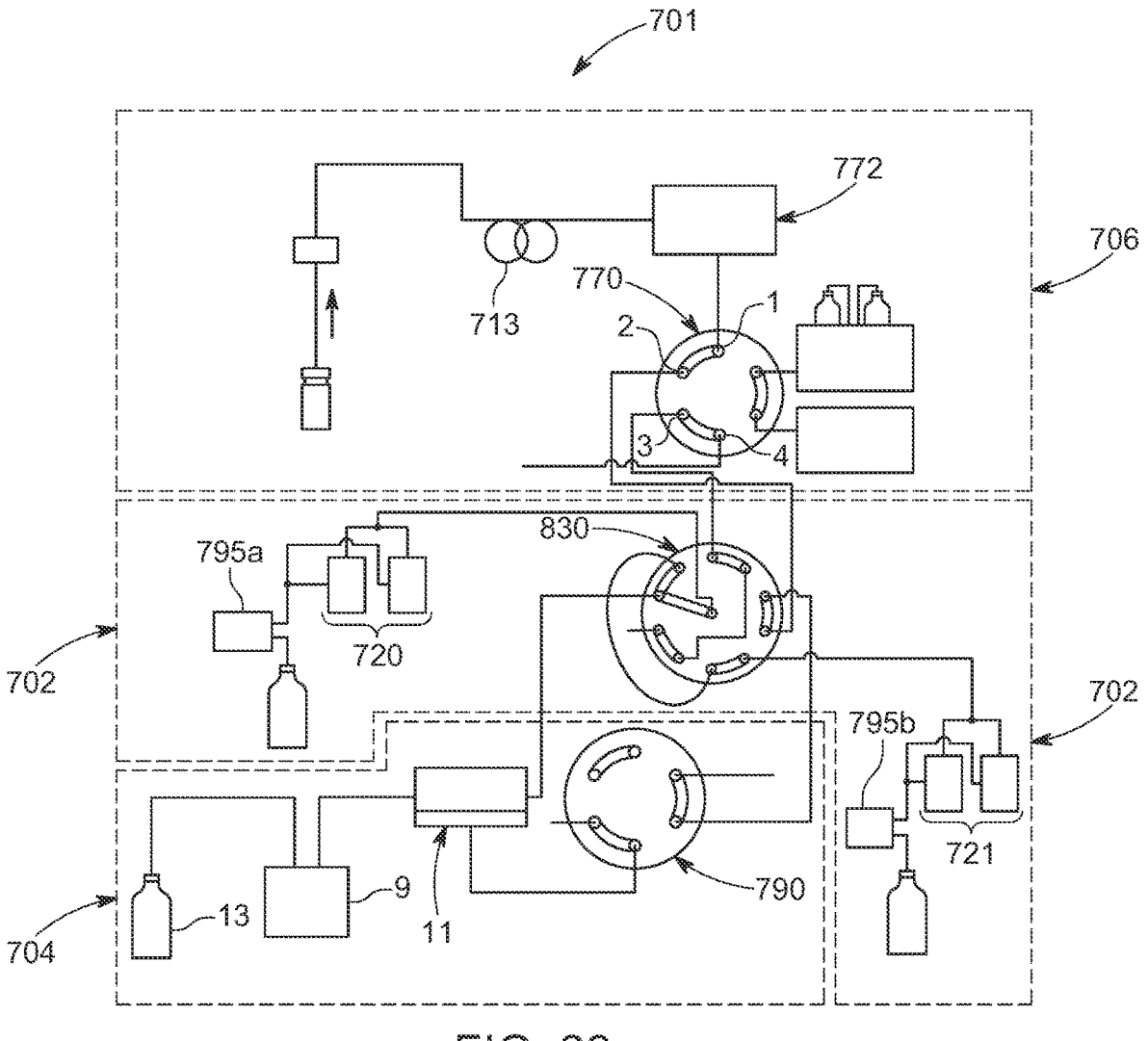
FIG. 22 is a schematic illustration of a sample preparation apparatus of the present invention.

An 11-port dilution valve 830 is illustrated in FIG. 22, via which filtrate from filter module 704 may be passed through purge valve 790 for selective recovery of sample by autosampler module 706. Moreover, purge valve may be switched to a second condition in which first and second pumps 720, 721 may purge the sample line through filter module 704 and purge valve 790 to waste. FIG. 23 illustrates a second condition/rotational position of dilution valve 830 that permits diluent from second pump 721 to push the sample into sample loop 744 on dilution valve 830.

Figure 24:
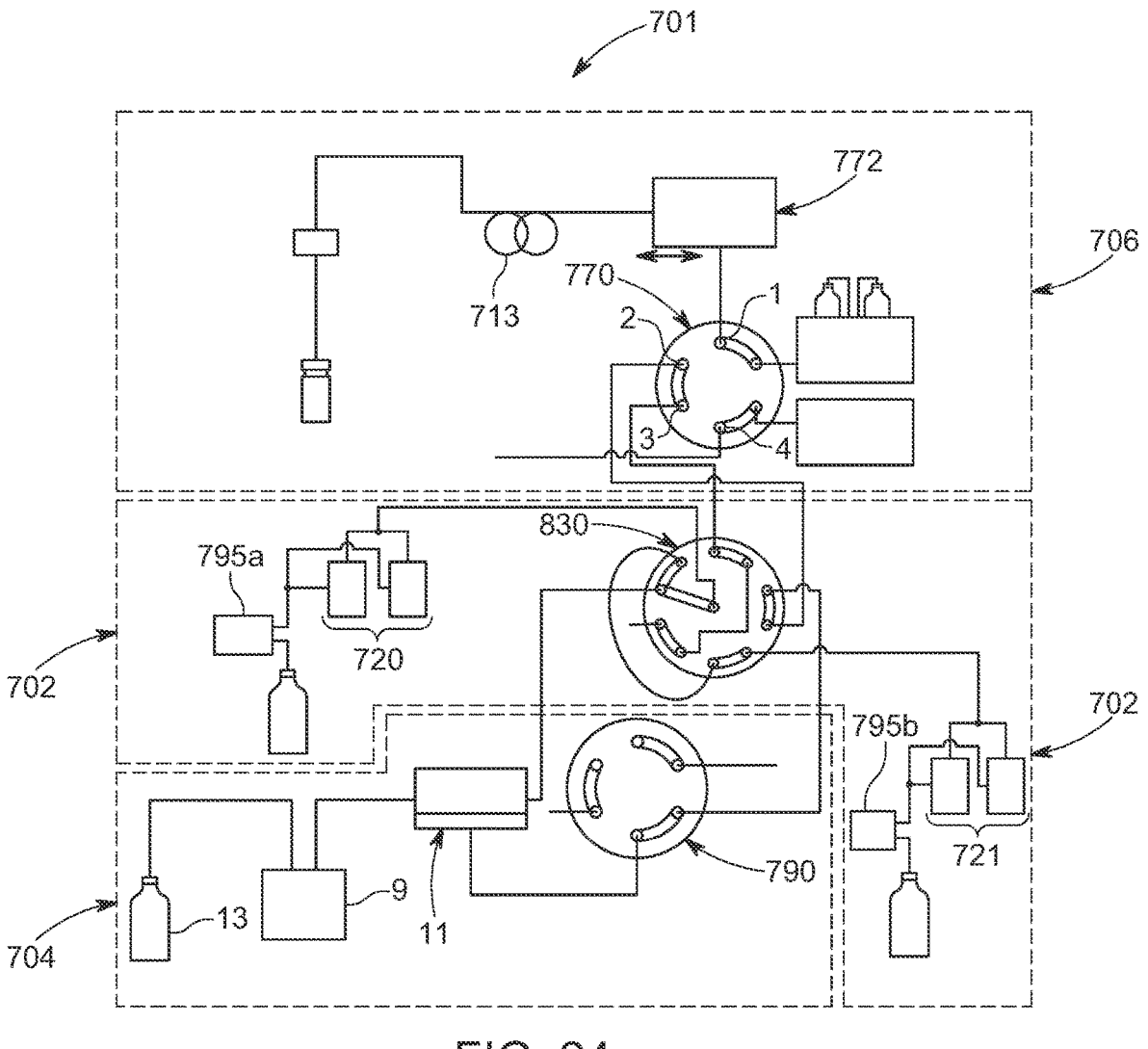
FIG. 24 is a schematic illustration of a sample preparation apparatus of the present invention.
Figure 25:
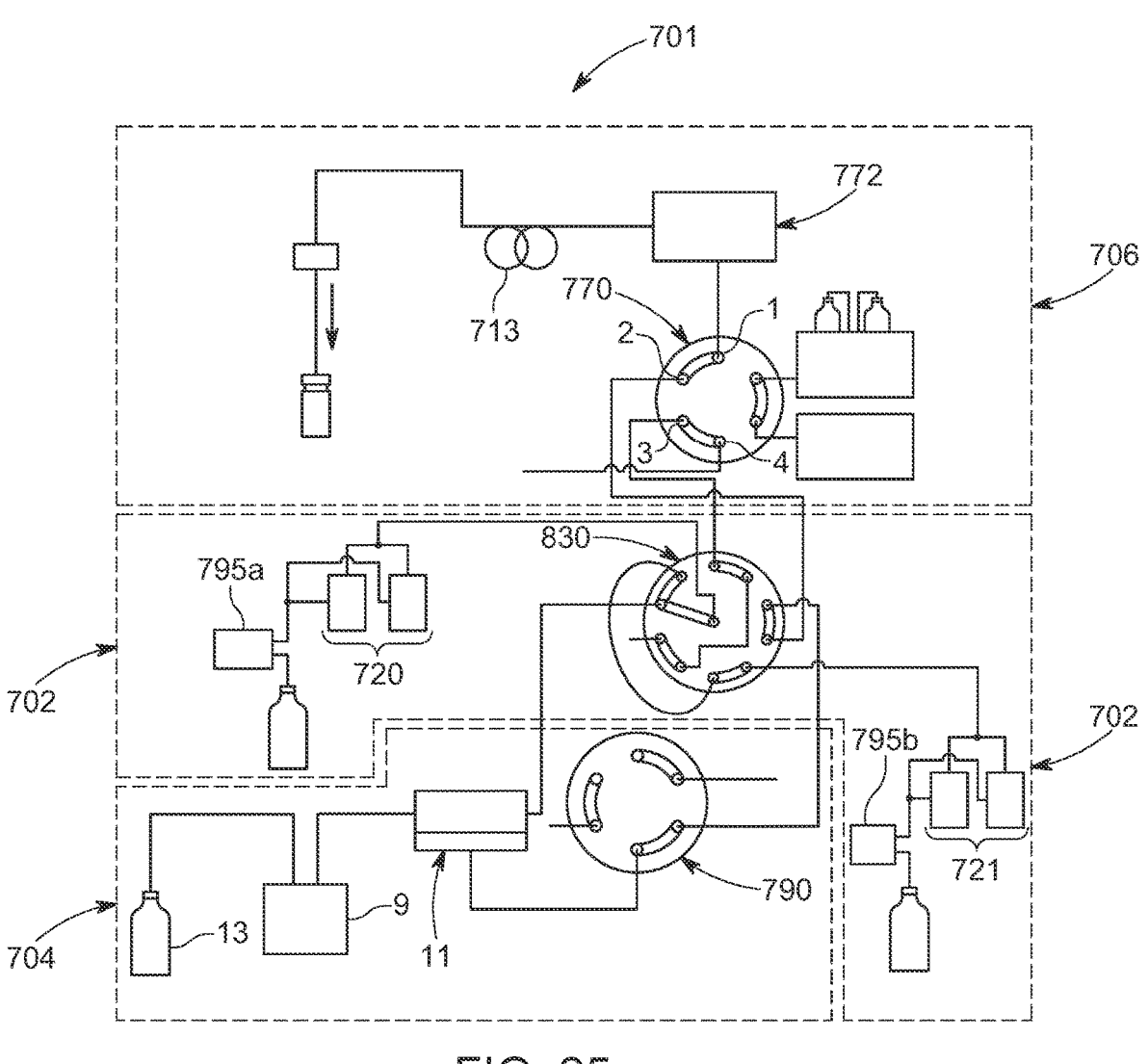
FIG. 25 is a schematic illustration of a sample preparation apparatus of the present invention.

FIG. 24 illustrates dilution valve 830 back in the first condition/rotational position, such that sample in sample loop 744 may be pushed and merged with the main flow from first pump 720. The diluted sample may then be delivered to filtration module 704 for separation. Filtrate of filtration module 704 may be pushed through purge valve 790, back to dilution valve 830, and then to autosampler valve 770 of autosampler module 706 for selective diversion to sampling or waste. In a first position of autosampler valve 770, sample is delivered to a selected vial for fractionated sample collection (see FIG. 25). After or between sample collections, the sample flow path may revert to the arrangement of FIG. 23 for clean up of the autosampler flow path.

Examples

Figure 4:
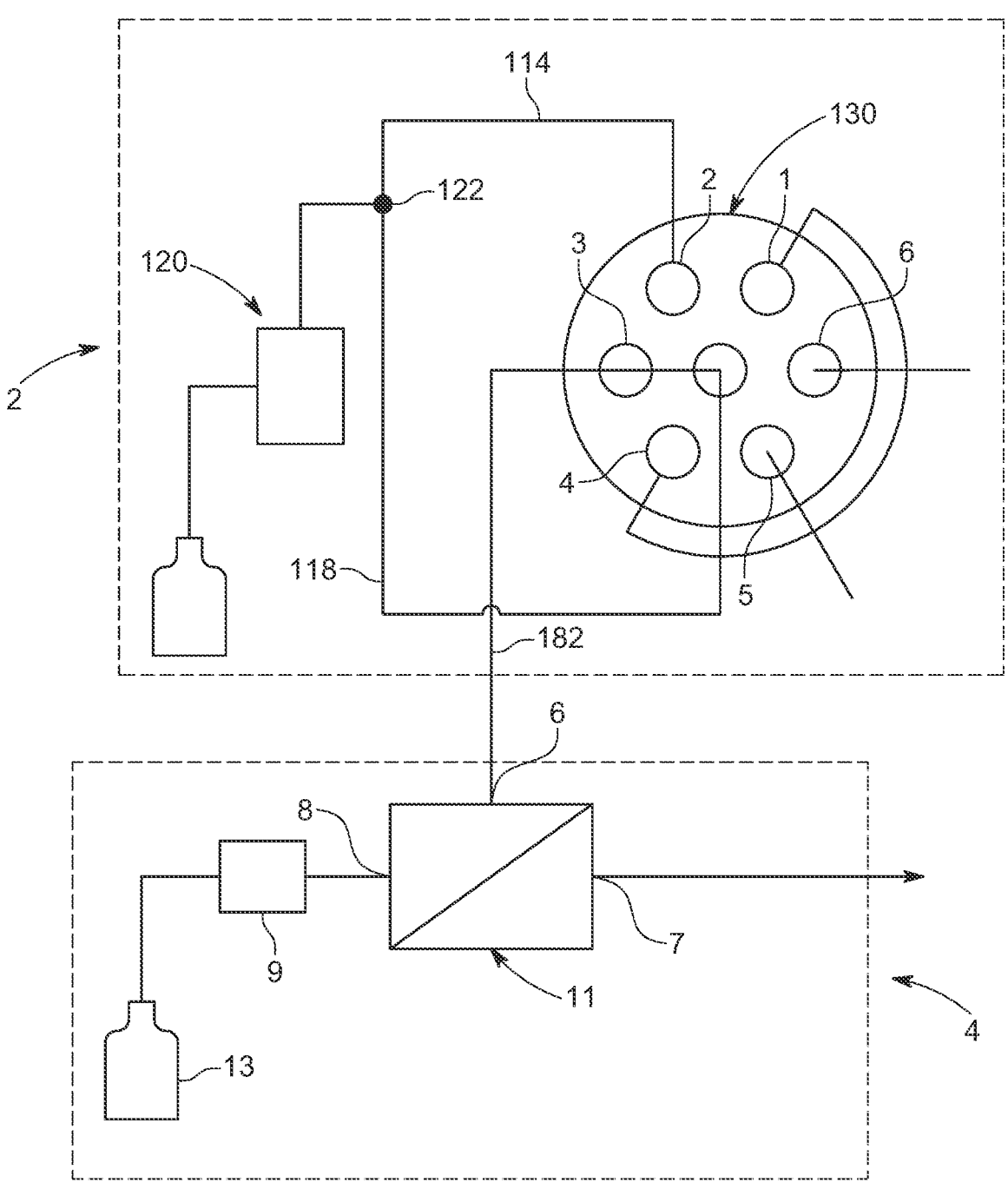
FIG. 4 is a schematic illustration of a sample preparation apparatus of the present invention.
Figure 5:
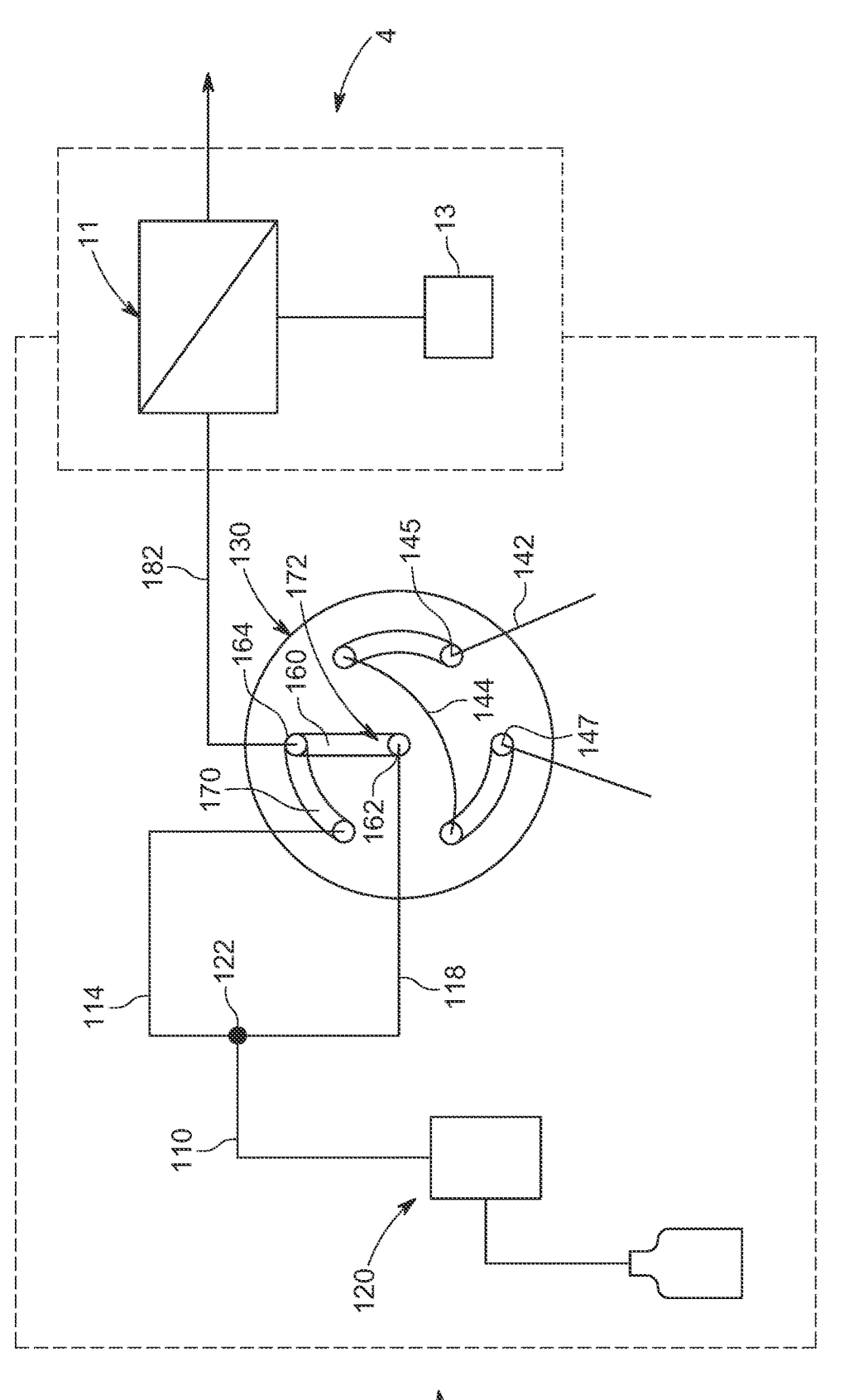
FIG. 5 is a schematic illustration of the sample preparation apparatus of FIG. 4 in a first condition.
Figure 6:
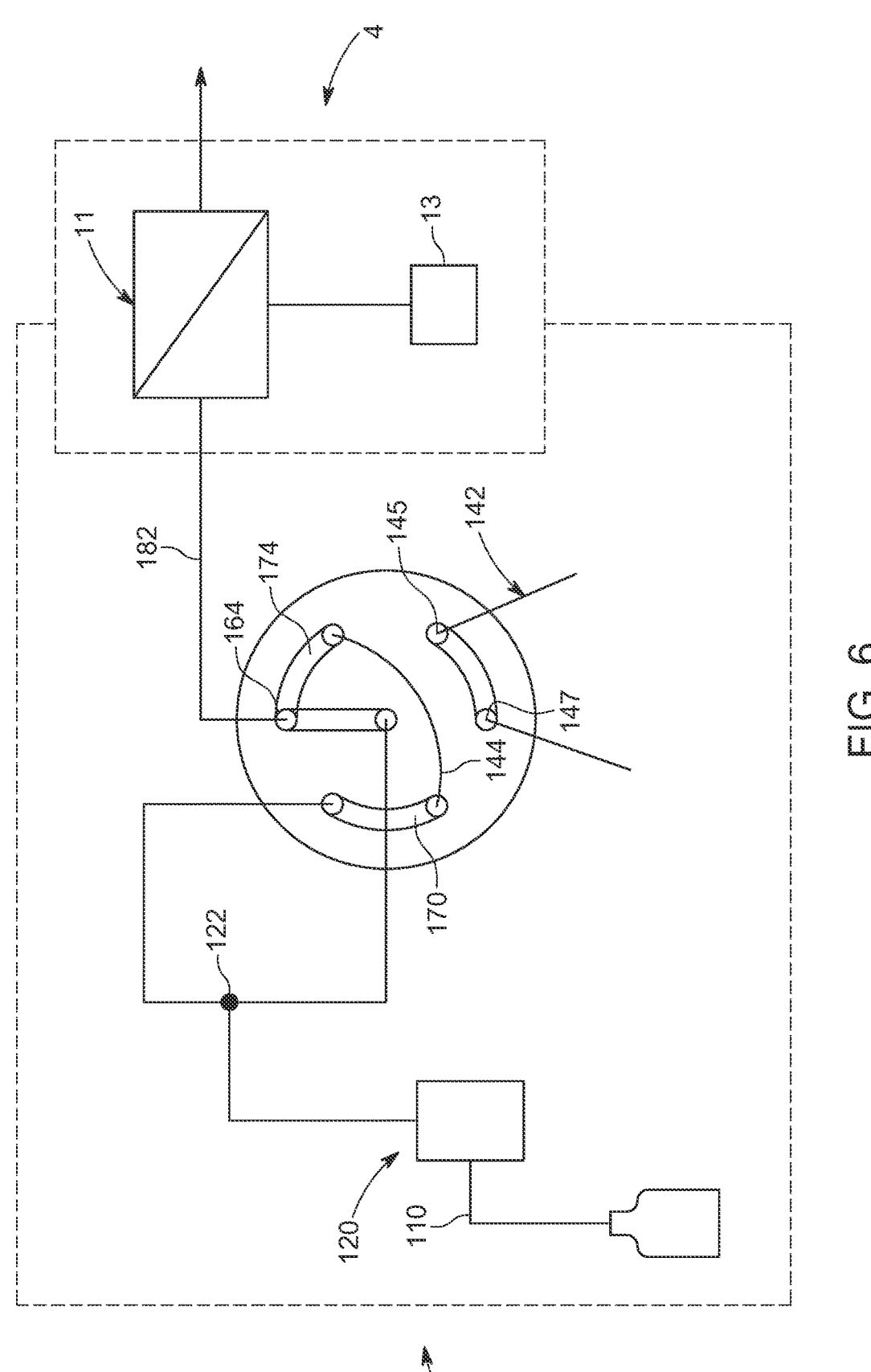
FIG. 6 is a schematic illustration of the sample preparation apparatus of FIG. 4 in a second condition.
Figure 7:
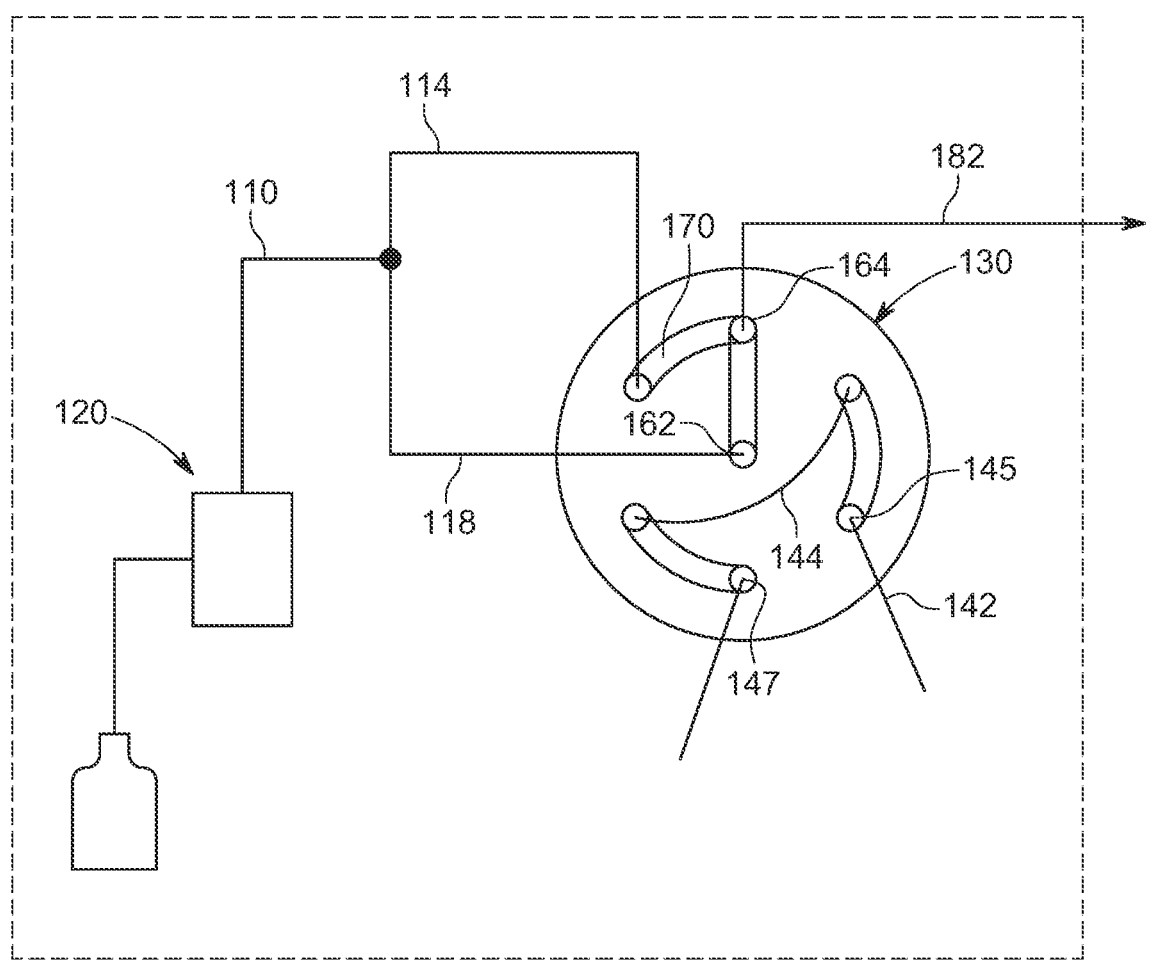
FIG. 7 is a schematic illustration of the sample preparation apparatus of FIG. 4 in a first condition.
Figure 8:
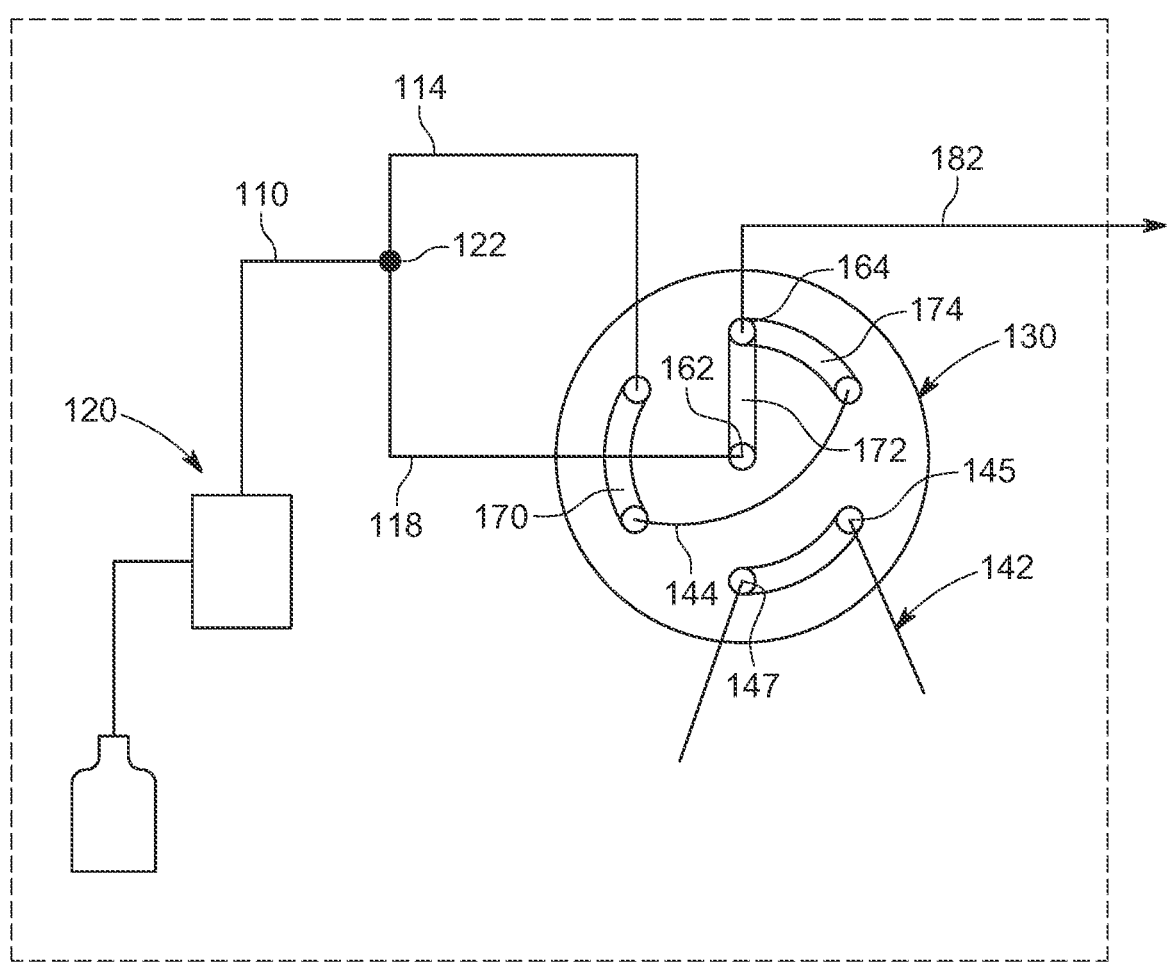
FIG. 8 is a schematic illustration of the sample preparation apparatus of FIG. 4 in a second condition.

A system as described in FIG. 4 was used as a single-pump arrangement, and as described in FIG. 15 as a two-pump arrangement to study dilutions of sample solutions, with water or 0.1% Formic acid solution as the diluent to achieve a dilution of about 200×. The sample loop had a volume of about 15 µL to generate about 3 ml of diluted sample stream using the 200× dilution ratio. The filters used in the filtration module include Sartorious Hydrosart 10k MWCO, Sartorious Hydrosart 5k MWCO, and Sartorious PES 10k MWCO.

Figure 26:
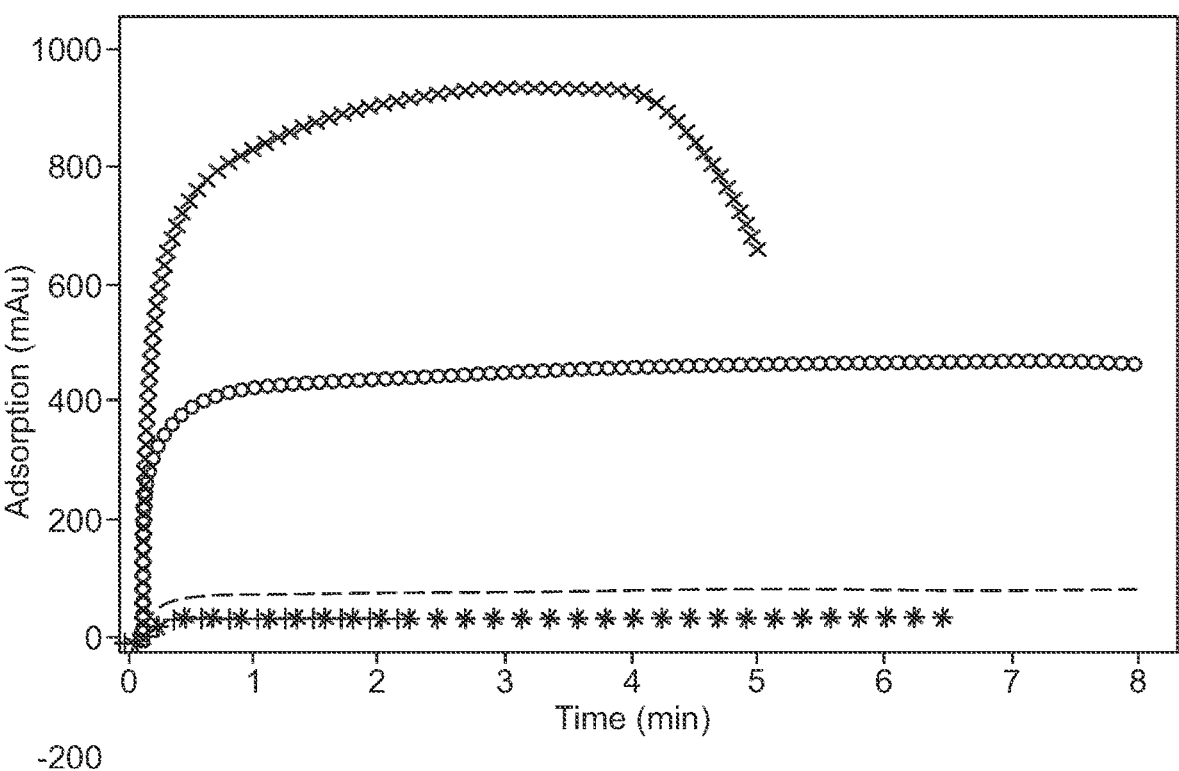
FIG. 26 is a chart depicting UV absorbance of samples tested with varied dilution levels.
Figure 30:
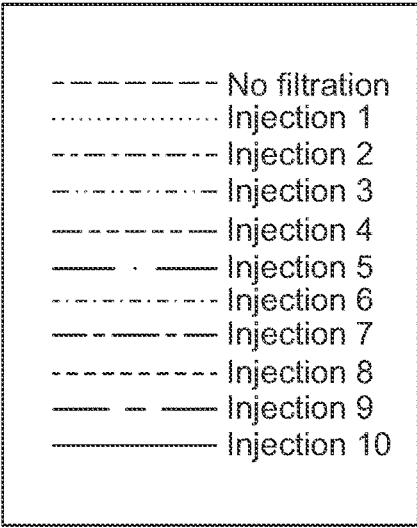
FIG. 30 is a chart depicting UV absorbance of filtrate from samples and a non-filtered sample.
Figure 30:
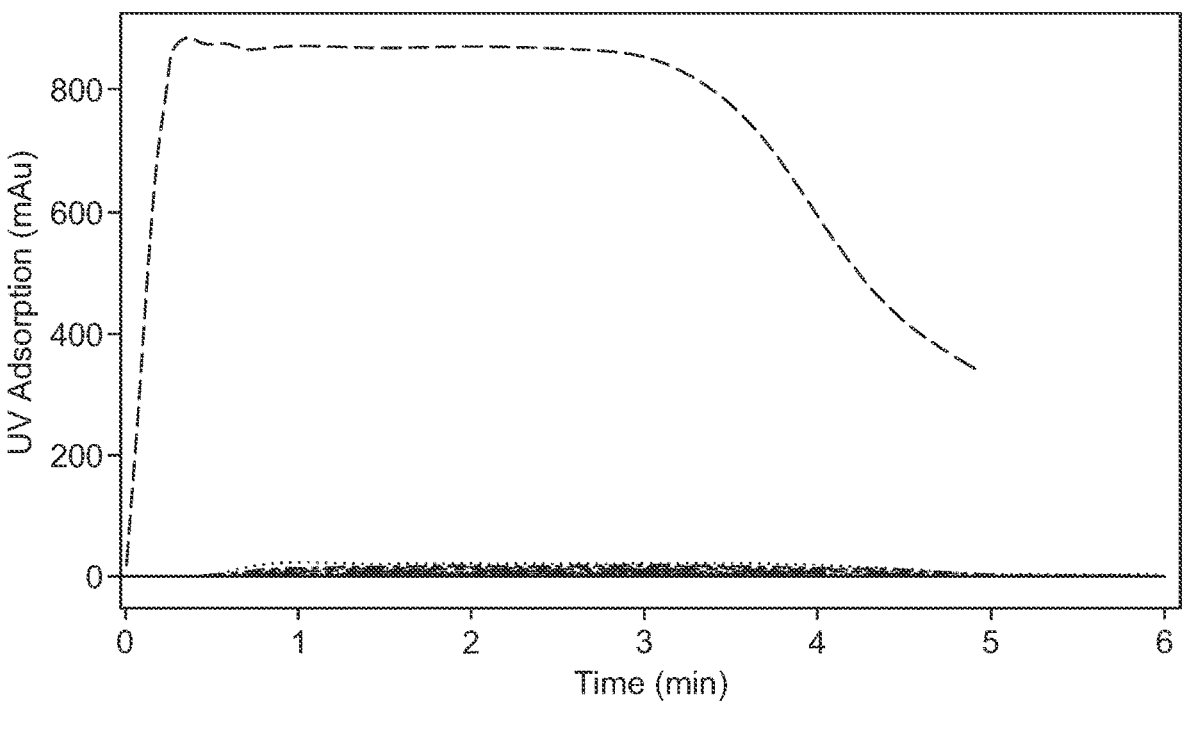

FIG. 26 shows a dilution test based on the two-pump system with varied dilution levels and a one-pump system with a dilution level at about 200×. For the two-pump system, two pumps from an Agilent 1290 system were used without any damper to reduce pressure fluctuations. The injector valve was used, and a larger sample was used for the low dilution level. FIG. 30 shows that the lower dilution levels (10% and 5%, corresponding to 10× dilution and 20× dilution, respectively), there are signal fluctuations. For the 10× dilution, the signal did not achieve a stable steady state. But for high dilutions, the signal reaches a steady state and for the 200× dilution level, the two-pump system and one-pump system matched very well.

For the purposes hereof, the term "steady state" is intended to mean a condition that does not change with time, and specifically a concentration of sample in the sample stream that fluctuates by less than 10% over a time period that is at least 10% of the total injection period. In some embodiments, a steady state is achieved only when the concentration of sample in the sample stream fluctuates by less than 5% over a time period that is at least 10% of the total injection period. In some embodiments, a steady state is achieved only when the concentration of sample in the sample stream fluctuates by less than 2% over a time period that is at least 10% of the total injection period. In some embodiments, a steady state is achieved only when the concentration of sample in the sample stream fluctuates by less than 1% over a time period that is at least 10% of the total injection period. In some embodiments, a steady state is achieved only when the concentration of sample in the sample stream fluctuates by less than 10% over a time period that is at least 20% of the total injection period. In some embodiments, a steady state is achieved only when the concentration of sample in the sample stream fluctuates by less than 5% over a time period that is at least 20% of the total injection period. In some embodiments, a steady state is achieved only when the concentration of sample in the sample stream fluctuates by less than 2% over a time period that is at least 20% of the total injection period. In some embodiments, a steady state is achieved only when the concentration of sample in the sample stream fluctuates by less than 1% over a time period that is at least 20% of the total injection period. In some embodiments, a steady state is achieved only when the concentration of sample in the sample stream fluctuates by less than 10% over a time period that is at least 40% of the total injection period. In some embodiments, a steady state is achieved only when the concentration of sample in the sample stream fluctuates by less than 5% over a time period that is at least 40% of the total injection period. In some embodiments, a steady state is achieved only when the concentration of sample in the sample stream fluctuates by less than 2% over a time period that is at least 40% of the total injection period. In some embodiments a steady state is achieved only when the concentration of sample in the sample stream fluctuates by less than 1% over a time period that is at least 40% of the total injection period.

For the purposes hereof, the total injection period is a time period defined between the injection start (dilution valve switch from load condition to inject condition) and the injection end (dilution valve switch from inject condition to load condition). The total injection period is considered to be a period of time, and not associated with an absolute time.

Figure 27:
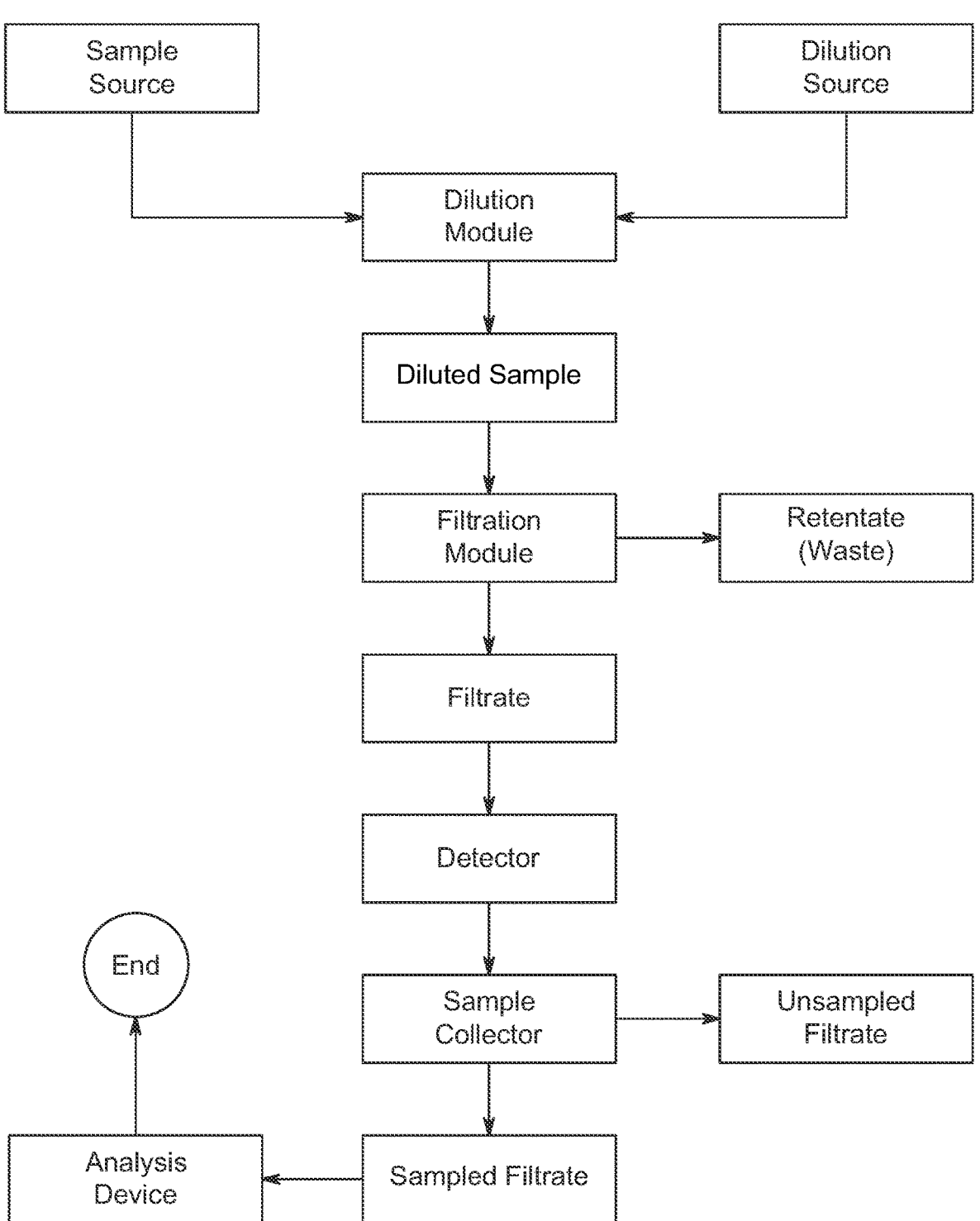
FIG. 27 is a work flow diagram of sample preparation and analysis in accordance with the present invention.

For the purposes hereof, the concentration of sample may be determined by various measurements, including by electromagnetic radiation absorption of the sample stream. In a particular example, concentration may be determined by % absorption of ultraviolet radiation emitted by a UV detector. FIG. 27 is an example workflow diagram, wherein a sample from a sample source and diluent from a diluent source are mixed in dilution module 2 as described above to obtain a diluted sample. The diluted sample is directed to filtration module 4, wherein the diluted sample is filtered into a retentate and a filtrate. Concentration of one or more sample constituents within the filtrate is determined by a detector, such as a UV detector. In some embodiments, the filtrate is thereafter directed to a sample collector for collecting sample in the filtrate detected by the detector. The sample collector may then be controlled as described herein to distinguish sample from the filtrate, such that a sampled filtrate portion may be considered separately from an unsampled filtrate portion. In some embodiments, the sampled filtrate portion is directed to an analysis device/ module, such as a liquid chromatograph, a mass spectrometer, or combinations thereof for analysis of the filtrate sample.

Gibco CD CHO media from Thermo-fisher was selected as a spent media sample. The total diluent flow rate was set at 1 ml/min. The filtrate was connected to a UV detector (Agilent 1290 Infinite II Variable Wavelength Detector). The UV detector also introduced significant flow resistance so that the tubing after the pressure transducer was set to balance the flow rates. It was found that using 15 cm of 0.004" I.D. tubing balanced the flow to about ⅓ to retentate and ⅔ to filtrate.

The liquid chromatograph system initiates its analysis when the sample injector valve switches to "Injection" position/condition, and begins injecting the diluted sample into the flow stream. At the 4.5 minute time mark, the valve switches back to the "Load" position/condition, and only diluent is conveyed through the system.

Figure 28:
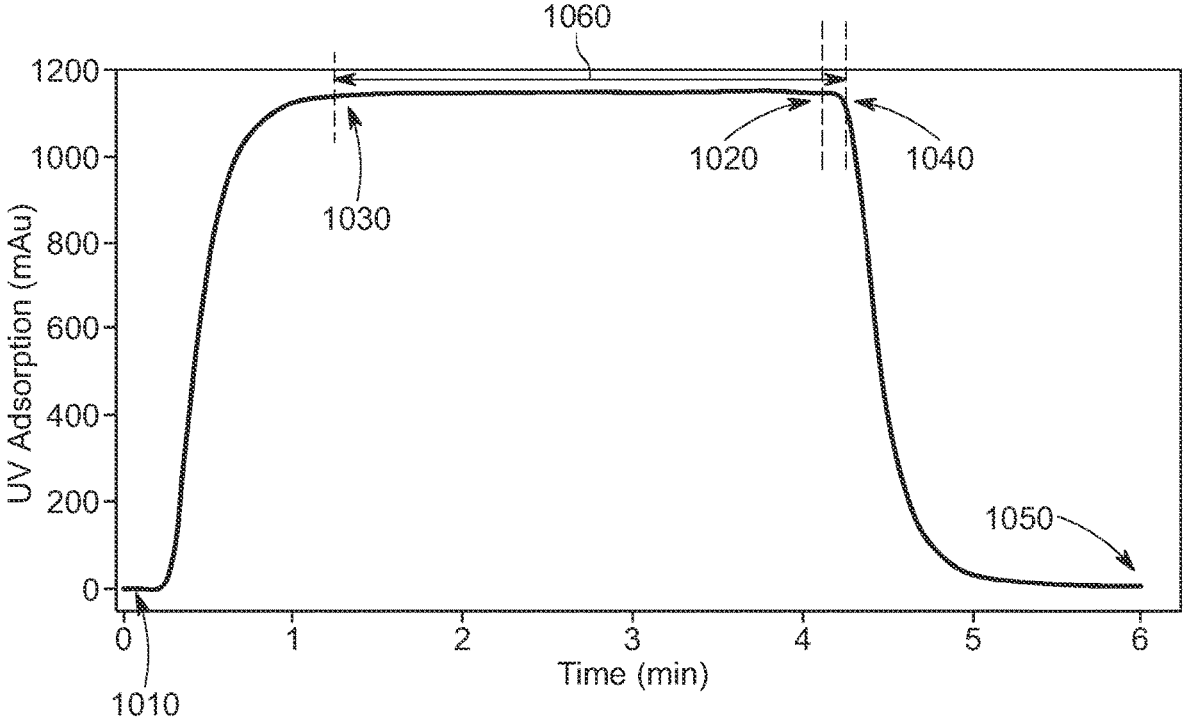
FIG. 28 is a chart depicting UV absorbance of filtrate from samples and sample collection control points with respect to UV absorbance of filtrate from samples.

FIG. 28 shows the UV absorption of the filtrate at a wavelength of 280 nm. The sample contains amino acids such as Tryptophan, Tyrosine, etc. that contribute to absorbance at 280 nm. As we can see, the UV absorption starts to increase after about 0.4 minutes, and reaches a steady state at about 1.5 minutes. Due to the delayed volume, the UV absorptance starts to decrease at about 4.75 minutes instead of 4.5 minutes after the valve actuates. At about 6 minutes, the UV absorbance nearly returns to the baseline. This shows that for cell culture medium having only small molecules below 10K MWCO, the tested method is capable of introducing the diluted sample into the filter, passing small molecules of interest through the filter, and cleaning the module after the injection.

FIG. 28 illustrates a UV absorption plot of filtrate absorption with demarcations indicating specific time points along the plot. A first switch time point 1010 is the time=0 plot point to indicate when the dilution module switches from the first condition (load) to the second condition (inject). A second switch time point 1020 indicates when the dilution module switches from the second condition (inject) to the first condition (load). The system undergoes cleanout while the dilution module is set in the first condition, wherein only the diluent passes along the fluidic pathway and removes residual sample from any previous test.

As the sample is injected, it is diluted in the dilution module 2 and filtered in the filtration module 4. As the pulse of injected sample reaches the detector, the increasing relative concentration of sample in the sample stream is indicated by increasing absorbance of the UV signal. The changing absorbance over time indicates a transient state in which sample concentration is substantially changing with time. Eventually, the absorbance of the UV signal stabilizes to a steady state, and a first steady state time point 1030 denotes a beginning of a first steady state concentration of sample in the sample stream. A first delay time period is determined between the first switch point 1010 and the first steady state time point 1030, at which a concentration of the sample in the sample stream has increased to the first steady state concentration.

A second steady state time point 1040 denotes an end of the first steady state concentration of sample in the sample stream, at a point at which the sample concentration in the sample stream has decreased from the first steady state concentration by a predetermined threshold value. In some embodiments, the predetermined threshold value is a decrease of 10% from the first steady state concentration. In some embodiments, the predetermined threshold value is a decrease of 5% from the first steady state concentration. A second delay time period is determined between the first steady state time point 1030 and the second steady state time point 1040.

A sample collector may be operated in connection with the time points associated with the sample pulse in the sample stream in order to distinguish the sample from the sample stream. In the case of the sample stream being downstream from the filtration module 4, the filtrate sample may be distinguished from the filtrate output from the filtration module 4. Although the sample collector may simply involve a delineation utility for interpreting results from an analysis module, the sample collector may instead comprise a fractional collector or other apparatus that separates the filtrate sample from the filtrate based upon instructions from a controller. In some embodiments, the controller may be adapted to operate the sample collector to begin distinguishing the filtrate sample from the filtrate upon an expiration of the first delay time period from the first switch time point, and to cease distinguishing the filtrate sample from the filtrate no later than the expiration of the second delay time period from the first steady state time point. In some embodiments, the collection period 1060 may therefore be defined as extending between time points 1030, 1040. The controller may further be adapted to operate the sample collector to cease distinguishing the filtrate sample from the filtrate upon the expiration of the second delay time period from the first steady state time point. For the purposes hereof, distinguishing the filtrate sample from the filtrate may include identification and/or separation of the filtrate sample from the filtrate.

FIG. 28 further illustrates a third steady state time point 1050 subsequent to second steady state time point 1040, wherein the third steady state time point 1050 denotes when the concentration of sample in the filtrate has decreased to a second steady state concentration. The second steady state concentration is illustrated in the plot segment following the transient state as the sample pulse passes by the detector. The third steady state time point 1050 defines a third delay time period between the second steady state time point 1040 and the third steady state time point 1050, and is the end of the sample run for analysis purposes. At or after third steady state time point 1050, the system is ready for another sample injection.

Once the timing parameters described above have been set for a first filtrate flow rate, the system may automatically adjust the collection period 1060 for alternative filtrate flow rates, which are dependent upon the dilution composition flow rate and the flow resistance exerted by the filter to split the dilution composition into the filtrate and the retentate. Thus, the controller need only have a calibration set of data for a particular fluidic volume defined by the fluidic pathway from the dilution module, through the filtration module, and to the sample collector, in order to appropriately segregate sample from a sample stream at various dilution composition flow rate set points.

Figure 29:
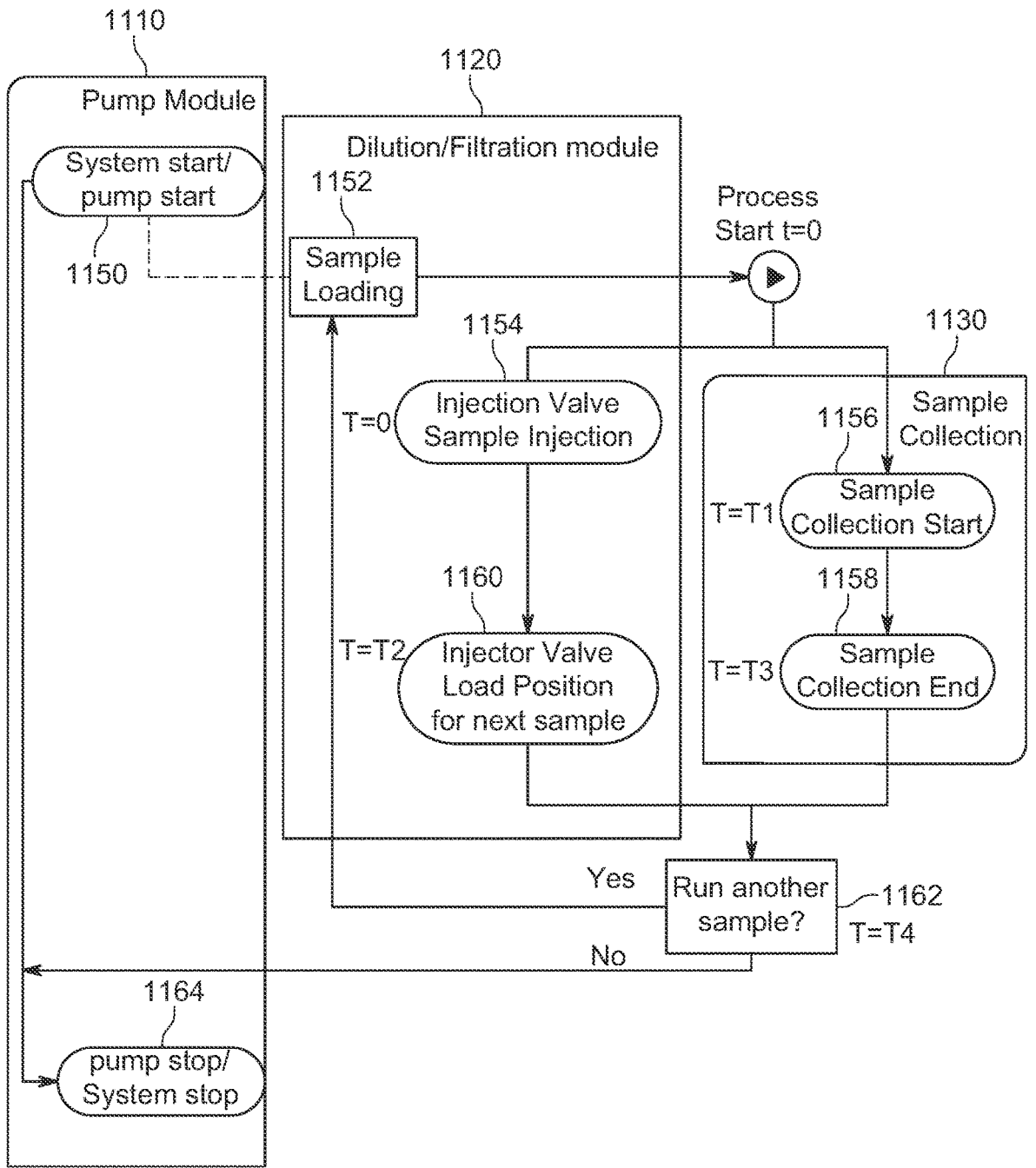
FIG. 29 is a control logic diagram for sample collection control points with respect to sample preparation apparatus operation.

FIG. 29 illustrates a logic flow diagram for the system controller operating a pump module 1110, a dilution/filtration module 1120, and a sample collection module 1130. A sample collection process is initiated at step 1150 to initiate pumping of sample into a dilution valve of dilution/filtration module 1120. Sample is loaded at step 1152 in preparation for sample dilution when the dilution valve is switched from a load condition to an inject condition. The first switch time point is recorded at step 1154 for sample dilution initiation when the dilution valve is switched to an inject condition. Sample collection start at step 1156 is initiated at the first steady state time point, and sample collection end at step 1158 occurs at the second steady state time point. The second switch time point is recorded at step 1160 for the end of sample injection when the dilution valve is switched back to a load condition. Another sample run is queried at step 1162, wherein either a return to sample loading step 1152 or system stop at 1164 is decided.

A concentrated BSA solution (30% w/v), having a molecular weight of about 66 kDa was subjected to the dilution and filtration process. The filtrate was analyzed using a UV detector at 280 nm. FIG. 30 shows the UV absorbance of filtrate of the BSA solution after passing through a Sartorius Hydrosart 10k MWCO filter with a surface area of about 6 cm² using water as the diluent. The "no filtration" curve in FIG. 30 shows just the diluted sample without filtration, which has a strong absorbance. The absorbance for the filtrate is much smaller. The first several runs show a slightly elevated UV absorbance (close to 20 mAu), but after 4 runs, the filtrate absorbance is stable at about 2 mAu, significantly lower than the 800 mAu absorbance of the unfiltered sample. This shows that the Hydrosart 10k MWCO filter can significantly block the large molecules that are responsible for undesired UV response (for BSA, it is 66 kDa).

Figure 31:
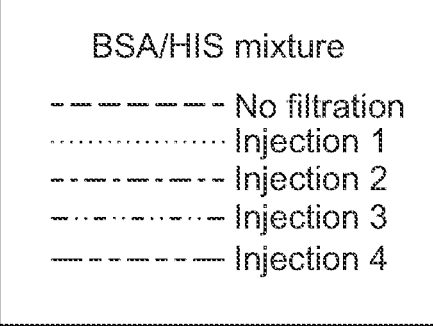
FIG. 31 is a chart depicting UV absorbance of filtrate from samples and a non-filtered sample.
Figure 31:
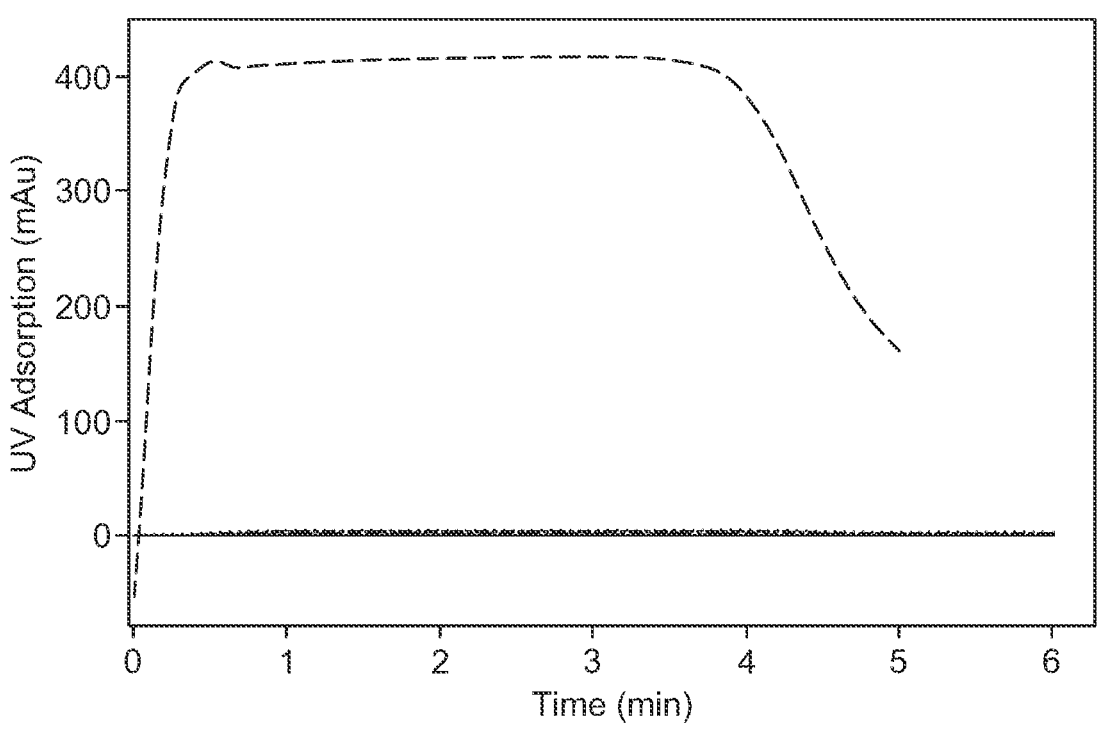
Figure 32:
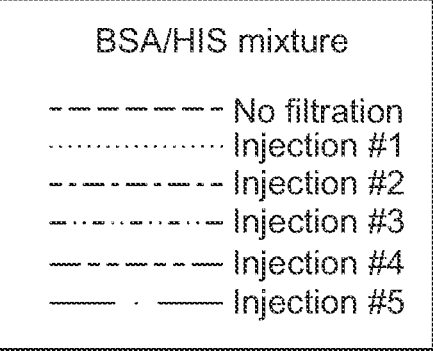
FIG. 32 is a chart depicting UV absorbance of filtrate from samples and a non-filtered sample.
Figure 32:
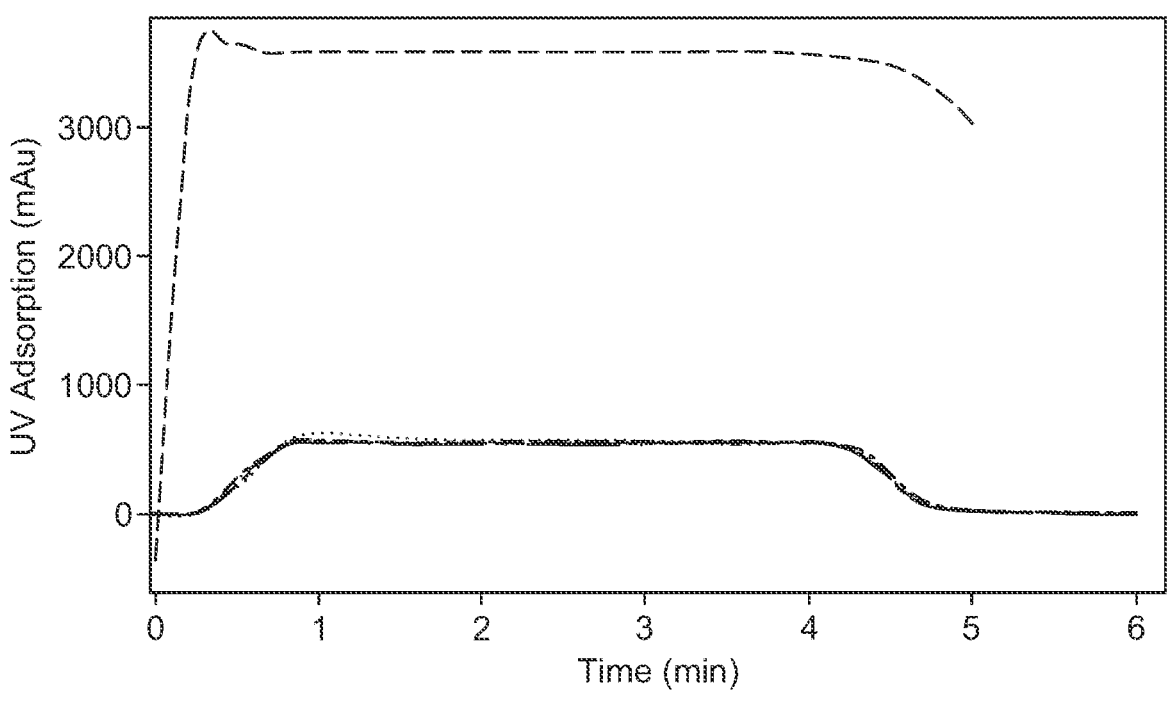

A mixture (1:1) of BSA (30% w/v) and Histidine (1% w/v) was also tested. BSA can be detected at 280 nm and 218 nm, but Histidine can only be detected at 218 nm, not at 280 nm. FIGS. 30 and 31 show the UV absorption of the filtrate at these two wavelengths. In FIG. 31, the "No filtration" curve shows UV absorption at about 400 mAu, which is about half of the stock BSA solution absorption (in FIG. 31, "no filtration" curve), because the mixture is 50:50 of BSA and Histidine. The UV absorption at 280 nm diminished to about 1 mAu after filtration to significantly block the large BSA molecules. At the same time, FIG. 32 shows that for no filtration, the UV absorption at 218 nm of the mixture is very high, due to absorption from both BSA and Histidine. However, after applying filtration, the UV absorption at 218 nm is also greatly reduced, and the absorption level is about half of the 1% Histidine solution. This means that the filtration successfully blocks the large molecules (BSA), but also permits the small molecules (Histidine) to pass through the filter. FIG. 31 and FIG. 32 also show that for multiple injections with no extra cleaning between each injection, the process is repeatable, and the absorption goes back to baseline at the end of each run.

Figure 33:
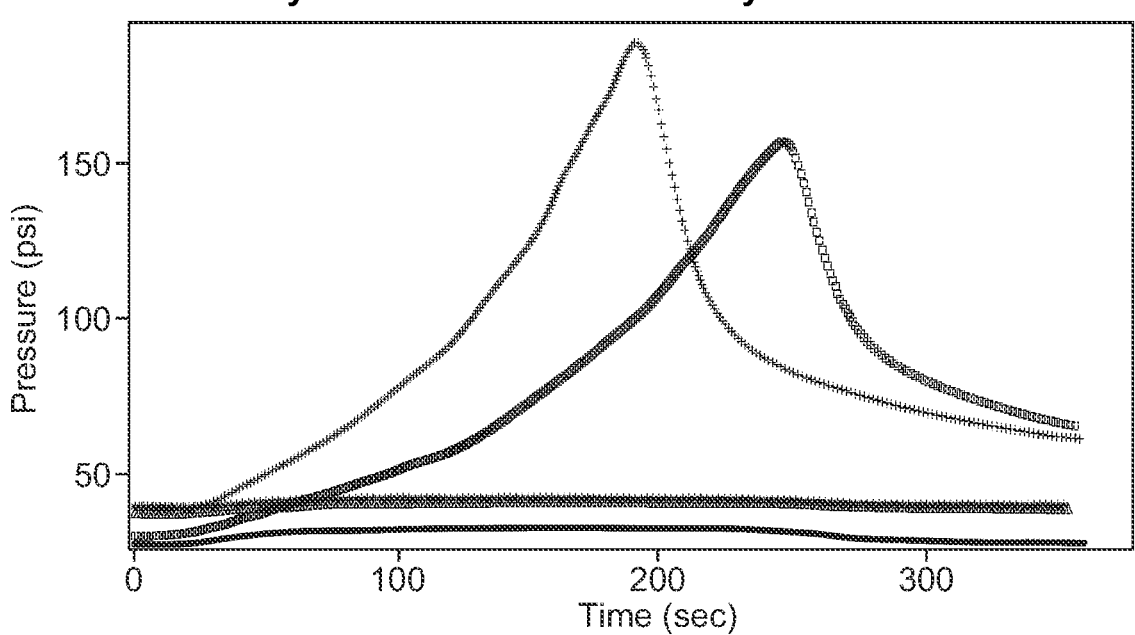
FIG. 33 is a chart depicting filtration pressure over time.
Figure 34:
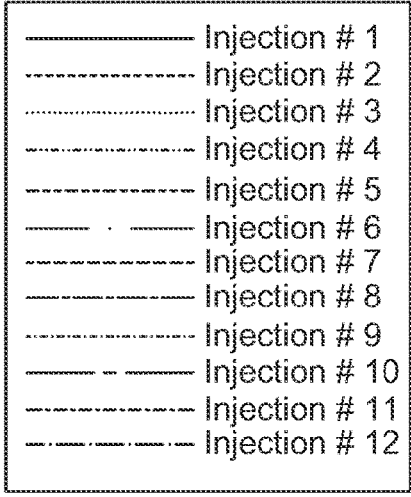
FIG. 34 is a chart depicting filtration pressure over time.
Figure 34:
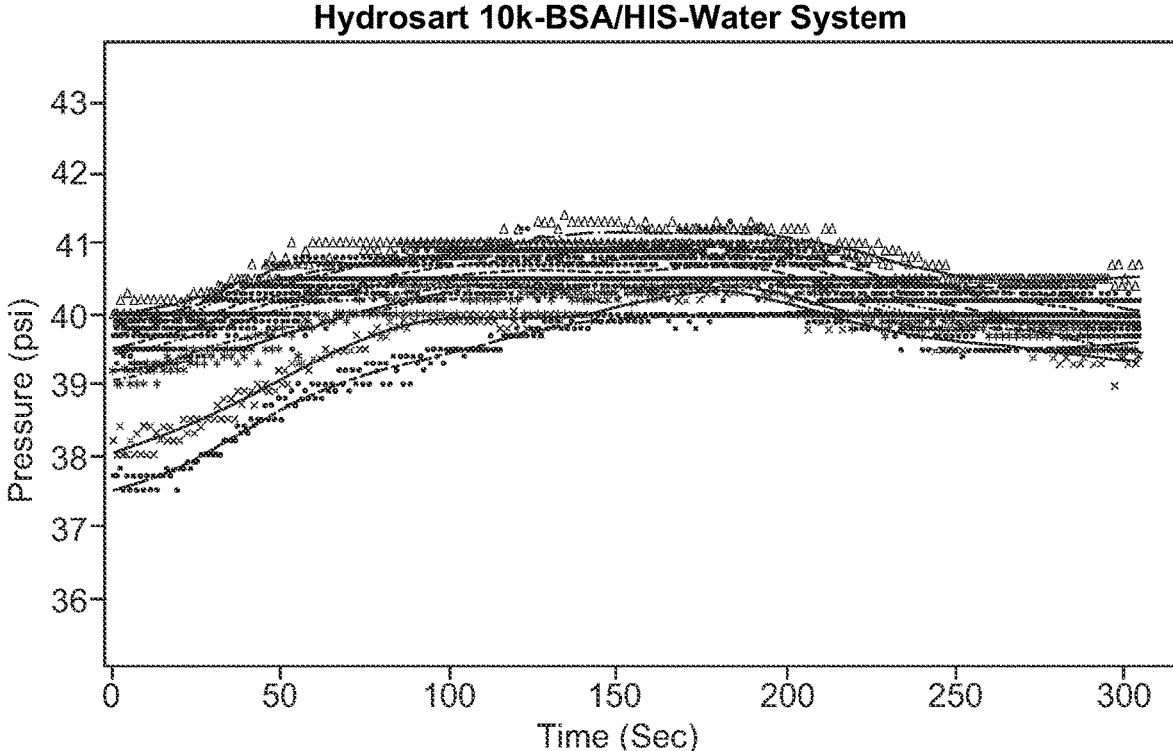

Repeated injections on the filtration module were performed with and recordation of the pressure reading from the pressure transducer. FIG. 33 shows the pressure reading of several runs, including two dead-end flows and three crossflows (tangential flow). After each dead-end flow, the filter was back flushed for 10 minutes. No extra cleaning was required or performed after each crossflow filtration. For dead-end flow, the pressure starts to increase very significantly after the sample starts to flow into the filtration module, and large BSA molecules begin to accumulate on the surface of the filter and form a "filter cake". This "filter cake" adds more flow resistance to the flow, and requires much higher pressure to push through the small molecules. The crossflow runs have much lower pressure during the run, and it can be repeated without much pressure change. FIG. 34 shows the pressure response of 12 continuous injections of BSA/HIS mixture into a Hydrosart 10k MWCO filter module. It shows that for the 12 sample injections, the pressure variations between each run are very small. This shows that there is minimum filter fouling even with the high concentration of BSA samples when the crossflow filtration is applied.

The invention claimed is:

1. A method for processing a cell culture composition of cells and spent media, the method comprising:
(a) obtaining a sample of the cell culture composition from a source;
(b) providing a processing apparatus having:
(i) a dilution module for mixing the sample of the cell culture composition with a diluent to form a dilution composition, wherein the dilution module is operable in at least two conditions, with a first load condition loading the cell culture composition into a sample loading chamber, and a second inject condition combining the cell culture composition from the sample loading chamber with the diluent to form the dilution composition;
(ii) a filtration module having a filter for filtering the dilution composition into a filtrate and a retentate;
(iii) a sample collector for distinguishing a filtrate sample from the filtrate, wherein the processing apparatus defines a first fluidic pathway from the dilution module, through the filtration module, and to the sample collector;
(c) motivating the dilution composition through the first fluidic pathway; and
(d) operating the sample collector to:
(i) begin distinguishing the filtrate sample from the filtrate at a first steady state time point when a concentration of the sample in the filtrate at the sample collector has increased to a first steady state concentration; and
(ii) subsequent to step (d) (i), cease distinguishing the filtrate sample from the filtrate by no later than a second steady state time point when the concentration of the sample in the filtrate at the sample collector has decreased from the first steady state concentration by a predetermined threshold value.

2. The method as in claim 1 wherein the predetermined threshold value is 10%.

3. The method as in claim 1 wherein the sample collector distinguishes the filtrate sample from the filtrate by separating the filtrate sample from the filtrate.

4. The method as in claim 3, including motivating the filtrate sample to an analysis module for analyzing the filtrate sample.

5. The method as in claim 4 wherein the analysis module includes a liquid chromatograph, a mass spectrometer, and combinations thereof.

6. The method as in claim 1, including operating the dilution module to mix the sample with the diluent at a mixing ratio of at least 10 parts by volume of the diluent to one part by volume of the sample to form the dilution composition.

7. The method as in claim 6 wherein the sample of the cell culture matrix is mixed with the diluent without undergoing a precipitation process prior to the mixing.

8. The method as in claim 7 wherein the sample of the cell culture matrix is mixed with the diluent without undergoing a centrifugation process prior to the mixing.

9. The method as in claim 1, including recording a first switch time point when the dilution module switches from the first condition to the second condition, and recording a second switch time point when the dilution module switches from the second condition to the first condition.

10. The method as in claim 9, including measuring a first delay time period between the first switch time point and the first steady state time point that is subsequent to the first switch time point, and measuring a second delay time period between the first steady state time point and the second steady state time point that is subsequent to the first steady state time point.

11. The method as in claim 10, including operating the sample collector to begin distinguishing the filtrate sample from the filtrate upon an expiration of the first delay time period from the first switch point, and to cease distinguishing the filtrate sample from the filtrate no later than the expiration of the second delay period from the first steady state time point.

12. The method as in claim 11, including operating the sample collector to cease distinguishing the filtrate sample from the filtrate upon the expiration of the second delay time period from the first steady state time point.

13. The method as in claim 11, including measuring a third delay time period between the second steady state time point and a third steady state time point subsequent to the second steady state time point when the concentration of sample in the filtrate has decreased to a second steady state concentration.

* * * * *